United States Patent [19]
Allen et al.

[11] Patent Number: 5,983,602
[45] Date of Patent: Nov. 16, 1999

[54] METHOD OF PACKING A PORTABLE BASKETBALL SYSTEM

[75] Inventors: David A. Allen, Oconomowoc; Mark Edward Davis, Wauwatosa; Randy R. Schickert, Kewaskum; Clement F. Hying, Menomonee Falls, all of Wis.

[73] Assignee: Huffy Corporation, Miamisbburg, Ohio

[21] Appl. No.: 09/094,696

[22] Filed: Jun. 15, 1998

Related U.S. Application Data

[63] Continuation-in-part of application No. 08/337,884, Nov. 14, 1994, Pat. No. 5,632,480, and a division of application No. 08/812,011, Mar. 5, 1997, which is a continuation-in-part of application No. 08/593,322, Jan. 31, 1996, Pat. No. 5,916,047, which is a continuation-in-part of application No. 08/190,914, Feb. 3, 1994, Pat. No. 5,626,339.

[51] Int. Cl.⁶ .............................. B65B 5/08; A63B 63/08
[52] U.S. Cl. .............................................. 53/445; 473/479
[58] Field of Search ..................................... 473/479, 481; 53/445, 474; 206/579, 315.1, 315.9

[56] References Cited

U.S. PATENT DOCUMENTS

| | | |
|---|---|---|
| Re. 25,938 | 12/1965 | Mobley . |
| D. 264,740 | 6/1982 | Merino et al. . |
| T984,007 | 7/1979 | Richardson . |
| 1,043,387 | 11/1912 | Astruck . |
| 1,270,004 | 6/1918 | Chappell . |
| 1,570,403 | 1/1926 | Ripczinske . |
| 1,631,227 | 6/1927 | See . |
| 1,988,037 | 1/1935 | Furrer . |
| 2,457,908 | 1/1949 | Meyerhoefer . |
| 2,483,734 | 10/1949 | Neal . |
| 2,586,724 | 2/1952 | Sanneback . |
| 2,818,254 | 12/1957 | Dunn ........................................ 473/481 |
| 2,916,184 | 12/1959 | Hartley et al. . |
| 2,986,395 | 5/1961 | Sheftel . |
| 3,137,502 | 6/1964 | Duganich . |
| 3,341,197 | 9/1967 | Bottorff . |
| 3,401,774 | 9/1968 | Krahn . |
| 3,669,450 | 6/1972 | Mason . |
| 3,716,234 | 2/1973 | Lancellotti .............................. 473/481 |
| 3,722,903 | 3/1973 | Jones . |
| 3,841,631 | 10/1974 | Dolan . |

(List continued on next page.)

FOREIGN PATENT DOCUMENTS

| | | |
|---|---|---|
| 605246 | 5/1926 | France . |
| 2234942 | 2/1973 | Germany . |
| 2920903 | 12/1980 | Germany . |
| 19177 | of 1914 | United Kingdom . |
| 908055 | 10/1962 | United Kingdom . |

OTHER PUBLICATIONS

Huffy Youth Sports styrene basketball board (admitted prior art).
SureShot polystrene, structurally foamed basketball backboard (admitted prior art).
Huffy Sports Product Brochure, "Center Court Portables" (9H421—Tuff Stuff; 9H331—Zero Gravity; 9H366—Zero Gravity; 9H335—Get Vertical) (admitted prior art).
SportTime catalog, 1993 Summer Edition, p. 135, Cast Aluminum Fan–Shaped Backboard (Sep. 1993).
Porter, "Celebrate 100 Years of Baskbell," catalog (admitted prior art).
Huffy Sports, "Our All–Star Lineup" catalog (admitted prior art).

*Primary Examiner*—Raleigh W. Chiu
*Attorney, Agent, or Firm*—Howrey & Simon; Michael J. Bell; Andrew R. Kopsidas

[57] ABSTRACT

The ballast system for a portable basketball system is composed of dual ballast fillable tanks, which together form the base for supporting the pole, backboard and goal. The dual tank system includes a primary tank and a secondary tank cooperatively configured such that the secondary tank may be disposed in one position for compact shipping/storage and in another position to ensure stability during play. In particular, the secondary tank is centrally disposed within the dimensions of the primary tank during shipping. During play, the secondary tank is repositioned in a manner that elongates the primary tank to increase the footprint of the portable basketball system and concentrate the ballast of the secondary tank at the rear of the base.

7 Claims, 29 Drawing Sheets

U.S. PATENT DOCUMENTS

| | | |
|---|---|---|
| 3,900,194 | 8/1975 | Ward . |
| 3,908,992 | 9/1975 | Cunningham et al. . |
| 3,964,743 | 6/1976 | Salsich, Sr. . |
| 3,970,240 | 7/1976 | Van Leer . |
| 4,095,825 | 6/1978 | Butler . |
| 4,145,044 | 3/1979 | Wilson et al. . |
| 4,286,409 | 9/1981 | Taylor et al. . |
| 4,412,679 | 11/1983 | Mahoney et al. . |
| 4,424,968 | 1/1984 | Smith . |
| 4,478,415 | 10/1984 | Shaffer et al. . |
| 4,583,732 | 4/1986 | Allen . |
| 4,613,136 | 9/1986 | Raba et al. . |
| 4,640,211 | 2/1987 | Namur . |
| 4,653,646 | 3/1987 | Allen et al. ............ 473/481 X |
| 4,757,778 | 7/1988 | Scaglia . |
| 4,759,545 | 7/1988 | Grable . |
| 4,786,053 | 11/1988 | Barnes, Jr. . |
| 4,793,611 | 12/1988 | Thornell . |
| 4,826,162 | 5/1989 | Allen ........................ 473/481 |
| 4,869,501 | 9/1989 | Anastasakis . |
| 4,913,388 | 4/1990 | McCant . |
| 5,066,007 | 11/1991 | Niver . |
| 5,082,261 | 1/1992 | Pelfrey . |
| 5,098,092 | 3/1992 | Aakre et al. . |
| 5,100,132 | 3/1992 | Anderson et al. .............. 473/481 |
| 5,112,023 | 5/1992 | Sowers . |
| 5,145,153 | 9/1992 | Glynn . |
| 5,158,281 | 10/1992 | Williams . |
| 5,163,676 | 11/1992 | Taub . |
| 5,207,407 | 5/1993 | Fitzsimmons et al. . |
| 5,224,699 | 7/1993 | Zaruba . |
| 5,248,140 | 9/1993 | Matherne et al. . |
| 5,259,612 | 11/1993 | Matherne et al. . |
| 5,292,118 | 3/1994 | Allen et al. . |
| 5,354,049 | 10/1994 | Matherne et al. . |
| 5,354,053 | 10/1994 | Bathner et al. . |
| 5,375,835 | 12/1994 | Van Nimwegen et al. . |
| 5,377,976 | 1/1995 | Matherne et al. . |
| 5,415,393 | 5/1995 | Fitzsimmons et al. ............ 473/481 |
| 5,433,432 | 7/1995 | Adler . |
| 5,470,054 | 11/1995 | Bohrman . |
| 5,507,484 | 4/1996 | van Nimwegen et al. . |
| 5,556,088 | 9/1996 | Mower et al. ................ 473/479 |
| 5,836,838 | 11/1998 | Van Nimwegen et al. ............ 473/481 |
| 5,881,537 | 3/1999 | Schickert et al. ................ 53/445 |
| 5,893,809 | 4/1999 | Coats et al. ................ 473/479 |
| 5,902,197 | 5/1999 | Davis et al. ................ 473/479 |

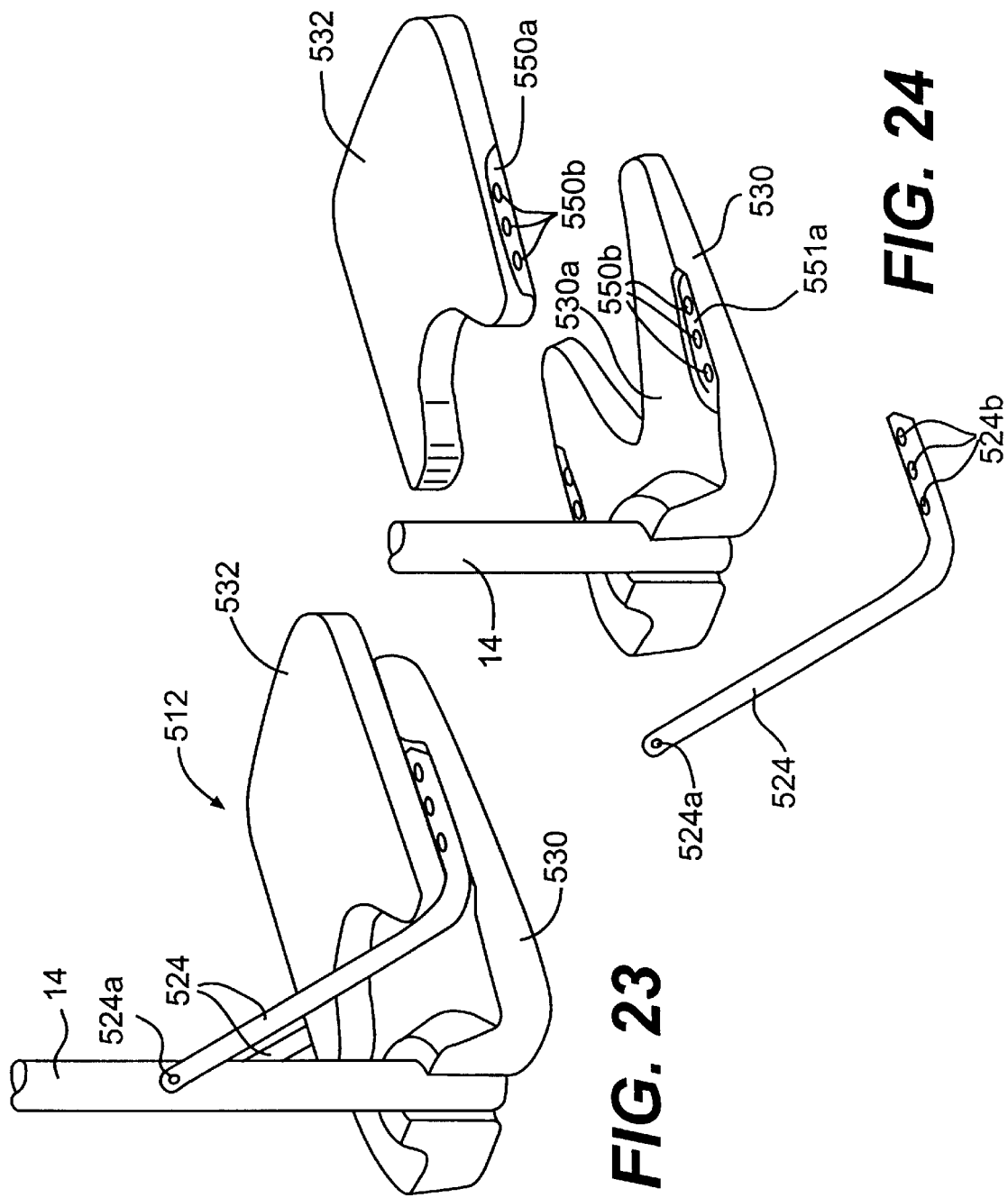

METHOD OF PACKING A PORTABLE BASKETBALL SYSTEM

RELATED APPLICATIONS

This application is 1) a divisional of co-pending application Ser. No. 08/812,011, filed Mar. 5, 1997, which is a continuation-in-part of co-pending allowed application Ser. No. 08/593,322, now U.S. Pat. No. 5,916,047, which is a continuation-in-part of co-pending allowed application Ser. No. 08/190,914, now U.S. Pat. No. 5,626,339; and 2) a continuation-in-part of co-pending allowed application Ser. No. 08/337,884, Filed Nov. 14, 1994 now U.S. Pat. No. 5,632,480.

BACKGROUND OF THE INVENTION

1. Field of the Invention

The invention generally relates to portable basketball systems and, more particularly, to a portable basketball system having dual ballast tanks where one of the tanks is movable between a compact position for shipping/storage and an expanded position providing a larger footprint to provide greater support and stability during play.

2. Related Art

Various types of portable basketball systems have been proposed and used in the past. Such proposals have recognized that stability, and in some instances portability, are desirable characteristics. However, stability and portability can present conflicting design considerations. Presently, to provide both stability and portability, portable basketball systems have a complex structural arrangement and a larger base, both of which are undesirable characteristics with respect to manufacture, cost efficiency, and storage/shipping.

These problems may be present to some degree in smaller applications like pool side and youth sports products, however, overcoming the conflicting design considerations of stability and portability is a more difficult task in designing larger units for adults and regulation play, which must be able to withstand heavier loads and more aggressive conditions. Moreover, the recent trend towards using larger and larger backboards in portable systems designed for regulation play has exacerbated these problems.

Conventionally, portable basketball systems of this type have included several main components: a basketball backboard supporting a basketball goal and a net; a pole and extension arm, elevator, or other mechanism for supporting the backboard on the pole; and a base for supporting the pole. Typically, ballast material such as water or sand is provided on top of or inside the base section to weigh down the unit, and provide the requisite stability during use. An example of a support system in which weights are provided on top of a base is disclosed in U.S. Pat. No. 4,869,501 to Anastasakis. An example of one of the first portable systems having ballast inside a base is described in the assignee's prior U.S. Pat. No. 5,207,407 to Fitzsimmons et al.

In Fitzsimmons et al. '407, a hollow tetrahedral base supports the pole and has an interior space for receiving ballast material. The support pole is secured at an angle at a rear portion of the base, so that the backboard mounted on the pole extends beyond the base and over the playing surface. A roller provided in a recess on a leading edge of the base facilitates moving the unit from one location to another. While the support assembly described in Fitzsimmons et al. '407 worked well and was portable, the size of the tetrahedral base made it inconvenient to store and ship in practice, even though the base consisted of two smaller symmetrical sections.

An improvement over this portable goal assembly is described in U.S. Pat. No. 5,415,393 to Fitzsimmons et al., also developed by the assignee of this application. Like the above-described unit, Fitzsimmons et al. '393 utilizes a hollow base that is filled with ballast material and the support pole is mounted on a rear portion of the base at an angle. However, the base of the '393 patent is much smaller in height and flatter than the prior tetrahedral base design. Moreover, the base is made from a single body rather than in two sections, and a separate support arm for the pole formed as a planar member is pivotally attached to the front end of the base. The support arm could be collapsed onto and nested on top of the base, as shown in FIGS. 1–2 of the '393 patent, thereby enabling the two-piece support system to occupy a smaller space when disassembled than when assembled, without sacrificing the stability needed for use. Thus, in practice, the unit of the '393 patent was easier to ship and store than that in the original '407 patent.

A further improved portable goal system is manufactured and sold by the assignee of this application under the CENTER COURT name. The CENTER COURT portable unit is similar to that disclosed in the '393 patent in many respects, including the base, which also is substantially flat and hollow, the rearwardly disposed angled pole, and the support pole pivotally attached to the front end of the base. However, the support pole in the CENTER COURT design is not a planar support arm, as in the '393 patent. Instead, two individual support arms formed as struts are pivotally attached to opposite sides of the front end of the base. The strut members are a less expensive alternative to the planar support arm of the '393 patent, and do not result in an appreciable loss of overall stability. Thus, the CENTER COURT unit has the advantage of being lighter in weight and more compact than the portable system of the '393 patent, without sacrificing stability.

Examples of other conventional, but less desirable, portable basketball systems can be found in U.S. Pat. Nos. 5,259,612, 5,248,140 and, 5,354,049 to Matherne et al.; and U.S. Pat. No. 5,556,088 to Mower et al. These patents disclose portable units also having a hollow base into which ballast material, such as water or sand, is disposed. However, in these patents, the pole is mounted vertically in the front portion of the base, and the support arms extend at an angle from the pole to the rear of the base. By setting the pole in the front of the center of gravity of the base in these units, it is easier to topple or "pullover" these units than the rear mounted pole units described above when applying downwardly directed force on the rim of the goal, which is a standard way to measure the stability of a portable unit.

Recently, less expensive portable basketball systems having front-mounted poles have become popular. One known inexpensive portable basketball system addresses this forward "pullover" problem experienced with a front-mounted pole by concentrating ballast in the rear of the base. In particular, a rearwardly extending base is formed by a metal frame with a tray at the rear. Two woven bags are provided, each to be filled with approximately 60 pounds of sand. The sand bags are positioned in the rear tray to stabilize the portable basketball system. However, because the ballast is rearwardly disposed, the system has a tendency to pullover backward.

An improved inexpensive, rear-concentrated portable system is manufactured and sold by the assignee of this application under the EZ COURT name. The EZ COURT system includes a base with a metal frame base and uses two ballast fillable tanks rearwardly mounted to the frame instead of sandbags. The frame expands outwardly and rearwardly from the pole. Thus, relatively wide ballast fillable tanks are used to concentrate ballast in the rear.

In the foregoing and other conventional goal units, achieving the greatest amount of stability, as measured by the amount of "pullover" force, should always be one of the paramount objects of a portable basketball system manufacturer. One approach to achieve this object is simply to use as much ballast as is practical. However, there are drawbacks to this approach, in that the more ballast to be used, the larger the base must be to accommodate the ballast. In the prior designs in which the base is hollowed to receive ballast, an increase in the amount of ballast necessitates an increased interior volume for the base, which can be accomplished by increasing the surface area, i.e. the footprint, of the base or its height. In the prior designs in which ballast sits on top of the base, it is likely necessary to provide a greater surface area for the base or to increase its strength to accommodate increased ballast. Increasing the size and/or strength of the base, in either type of design, disadvantageously increases the shipping costs, and increases the amount of storage space the unit will occupy.

One portable basketball system manufactured and sold by the assignee of this application under the HYDRO name, and which also is the subject of parent application Ser. No. 08/593,322, addresses these competing concerns by providing a separate ballast tank engageable with a non-ballast fillable base in two different positions. In one position, the separate ballast tank is engaged with the base to produce a compact configuration for shipping/storage and in the second position the tank is engaged with the base in an expanded position providing an increased footprint for greater support and stability for play.

Although this unit works well and achieves advantages over the prior art, there remains a need for a portable basketball system that can be shipped even more compactly, and can support the pole, backboard, and goal in an even more stable position during play without the danger of the portable basketball system tipping or moving than heretofore achievable. More particularly, there is a need for a portable basketball support system that provides greater stability and can carry heavier loads than heretofore practical without increasing the shipping/storage footprint of the system, and without sacrificing portability.

SUMMARY OF THE INVENTION

The invention meets these needs while avoiding the drawbacks and disadvantages of the prior systems by providing a dual ballast tank fillable base for a portable basketball system. The dual tanks are engageable in a first position when the unit is assembled for use and a second position for shipping or storage that occupies less space than the first position. In the assembled configuration, the ballast member preferably extends beyond the rear of the base to increase the pullover force required to topple the unit and provide more stability. A support pole preferably is mounted at the rear of the base. Thus, by extending the secondary ballast tank beyond the rear of the primary ballast tank, both the advantages of rearwardly disposed ballast and a rearwardly disposed pole may be achieved.

In the reduced volume storage/shipping position, the secondary ballast tank may be nested and retained within the profile of the primary ballast tank. The total space occupied by the primary and secondary ballast tanks when nested is thus reduced as compared to the space occupied when expanded and assembled for use. The portable support system of the invention can thus provide greater stability during play, while occupying less space when shipped or stored than would be possible in the previous conventional designs providing comparable performance.

More specifically, in one aspect of the invention, the portable basketball base for supporting a basketball goal system includes a first ballast fillable member and a second ballast fillable member. The second ballast fillable member is engageable with the first ballast fillable member in a first position defining a compact configuration and a second position defining an expanded configuration. The first ballast fillable member has an exterior contour adapted to receive the second ballast fillable member in either of the compact and the expanded configurations. For example, the exterior contour of the first ballast fillable member may include any combination of an indentation, a recess, a notch and an opening to receive the second ballast fillable member. Accordingly, the compact configuration defines a first footprint for the basketball goal system and the expanded configuration defines a second footprint for the basketball system that is larger than the first footprint. Either or both of the first and second ballast fillable members has a pole mount, including an inclined surface for mounting the pole at an angle. The first and second ballast fillable members are removably secured to each other by a connector, which may include the same member connecting the pole to the base.

Another aspect of the invention relates to a portable basketball system support including a ballast fillable base. The ballast fillable base has an exterior contour adapted to receive a ballast fillable adapter in a first disposition and a second disposition. The first disposition occupies a first dimension and the second disposition occupies a second dimension less than the first dimension. The ballast fillable adapter is preferably disposed in the exterior contour of the ballast fillable base.

In yet another aspect of the invention, a kit of basketball parts is provided for disposition within a relatively flat shipping container and capable of assembly into a basketball system. The kit of basketball parts includes: a first ballast fillable member having a height, a width, and a depth defining a cubic volume; and a second ballast fillable member adapted to be received by the first ballast fillable member without substantially increasing the first cubic volume.

Another aspect of the invention relates to a portable basketball system including a pole; a basketball backboard and goal assembly connectable with the pole; and a ballast fillable base capable of assembly with the pole and the backboard and goal assembly to form the basketball system. The base supports the pole in a stationary disposition and is connected to the pole such that the basketball backboard and goal assembly is suspended at an elevation above the base. The ballast fillable base has an exterior contour engageable with a ballast distribution member in a first configuration and a second configuration occupying less space than the first configuration. The basketball system further includes a ballast distribution member disposed in the exterior contour of the ballast fillable base.

According to yet another aspect of the invention, a method of distributing ballast for a base of a portable basketball system is provided. The method includes the steps of positioning a first ballast fillable member of a basketball system on a support surface, and engaging a second ballast fillable member with the first ballast fillable member such that a portion of the second ballast fillable member is disposed exterior to the first ballast fillable member. The second ballast fillable member is positioned preferably at a rear end of the basketball system; and a portion of the second ballast fillable member is nested in an exterior contour of the first ballast fillable member.

A further aspect of the invention relates to a method of packaging a base for a portable basketball system. The method includes the steps of nesting a first ballast fillable member within the cubic dimension of a second ballast fillable member without substantially increasing the cubic volume of the first ballast fillable member. A shipping container is provided for receiving the first and second ballast fillable members before or after nesting.

Other features and advantages of the invention will be apparent from the following detailed description, the accompanying drawings and the appended claims.

BRIEF DESCRIPTION OF THE DRAWINGS

FIG. 23 is a perspective view of a ballast fillable base of a portable basketball system in accordance with yet another embodiment of the invention in which the pole is mounted at the front of the two-piece ballast fillable base;

FIG. 24 is an exploded view of the two-piece ballast fillable base shown in FIG. 23;

DETAILED DESCRIPTION OF PREFERRED EMBODIMENTS

Figure 1:
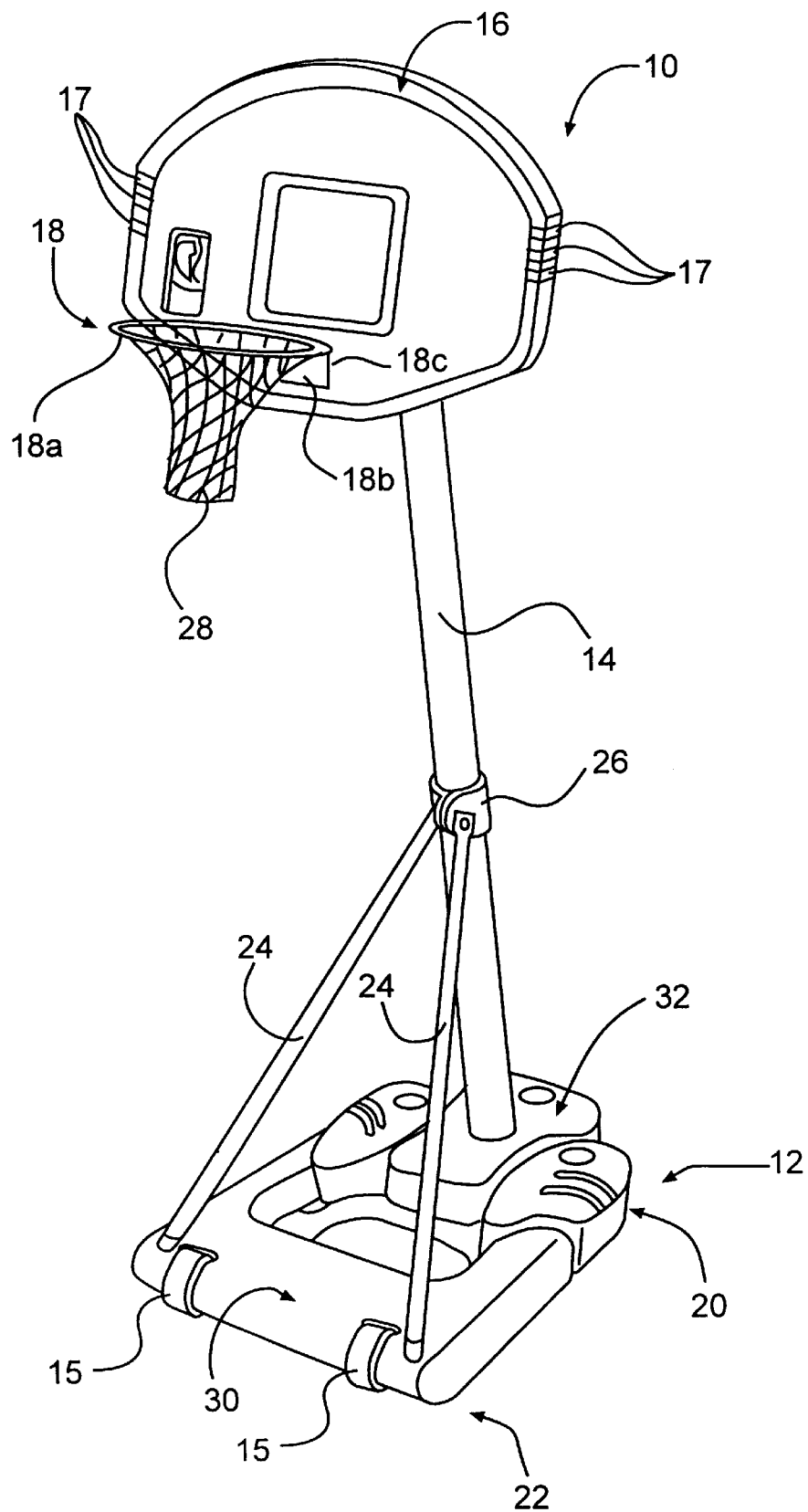
FIG. 1 is a perspective view of a portable basketball system having a ballast fillable base constructed in accordance with the principles of the invention.

Referring to FIG. 1, a portable basketball system of the invention is shown generally at 10. Portable basketball system 10 generally includes a two-piece, ballast fillable base 12, a basketball support pole 14, a backboard 16 and a goal 18. Goal 18 includes rim 18a, support arms 18b, and a mounting bracket 18c. A lower end of backboard support pole 14 is mounted on a rear end 20 of ballast fillable base 12, and an upper end of basketball support pole 14 extends towards front end 22 of ballast fillable base 12 such that pole 14 is disposed in a substantially upright position, but at an angle, preferably, 20 degrees to vertical.

By forwardly angling pole 14 toward front end 22 of ballast fillable base 12, pole 14 is loaded in compression along its longitudinal axis which reduces bending due to the weight of pole 14, backboard 16 and attached structure. This loading also reduces the tendency of pole 14 and backboard 16 to wave by transferring a greater load down pole 14 than if it were in a vertical position. It also allows for use of a pole having a smaller diameter than would be required if a vertically mounted pole were used. However, as will be illustrated in other embodiments of the invention, a vertically mounted pole may be used with the invention.

Pole 14 as illustrated has a circular cross section. However, other pole cross sectional shapes may be used, such as square; "pear"-shaped, as described in parent patent application Ser. No. 08/593,322; or other geometric or irregularly shaped cross sections having suitable strength and rigidity. Support struts 24 extend from front end 22 of ballast fillable base 12 to collar 26 mounted on pole 14. The upper end of basketball support pole 14 supports backboard 16 by way of support arms or other conventional hardware (not shown). Mounting bracket 18c of goal 18 is mounted on a front face of backboard 16 in any conventional manner and a net 28 hangs from goal 18, preferably with use of net clips as disclosed in the assignee's U.S. Pat. No. 5,524,883 to Allen et al., and U.S. patent application Ser. No. 08/540,127 filed, Apr. 30, 1996, the disclosures of which are incorporated herein by reference. Wheels 15 may also be included on front end 22 of ballast fillable base 12. One type of suitable wheel construction is disclosed in parent patent application Ser. No. 08/593,322.

Any of a variety of types and sizes of backboards may be used in the portable basketball system of the invention, including backboards made of molded plastic. Decorative recesses or grooves 17 may be integrally molded in the front face and/or sides of the backboard as disclosed in parent patent application Ser. No. 08/190,194. The recesses or grooves may be provided in a distinctive pattern, in whole or in part, as shown in the assignee's U.S. Design Pat. Nos. 362,881 and 371,813, for example, the disclosures of which also are incorporated herein by reference.

Ballast fillable base 12 has a two-piece construction defined by a primary ballast fillable tank 30 in engagement with a secondary ballast fillable tank 32. In the assembled position as shown in FIG. 1, secondary ballast fillable tank 32 is rearwardly disposed in primary ballast fillable tank 30. In particular, secondary ballast fillable tank 32 is disposed at rear end 20 of ballast fillable base 12 and extends beyond primary ballast fillable tank 30 so as to position as much ballast as practical toward rear end 20 of system 10, thereby increasing the overall footprint of ballast fillable base 12 in an assembled position for play, but not beyond reasonable constraints. In the embodiment shown, second ballast fillable tank 32 increases the footprint of primary ballast fillable tank 30 by about 25% so that the overall footprint of ballast fillable base 12 has a preferred length of about 58½ inches, a preferred width of about 34 inches and a preferred height or depth of about 8 inches, for example. By placing ballast as far from front end 22 of base 12 as possible in the preferred embodiment, more pullover force is required to topple the rear pole-mounted system 10, thereby increasing the stability of system 10. Moreover, system 10 provides sufficient stability to support larger, heavier backboards, such as a 48" composite backboard or a 44" steel or composite framed acrylic backboard.

Figure 2:
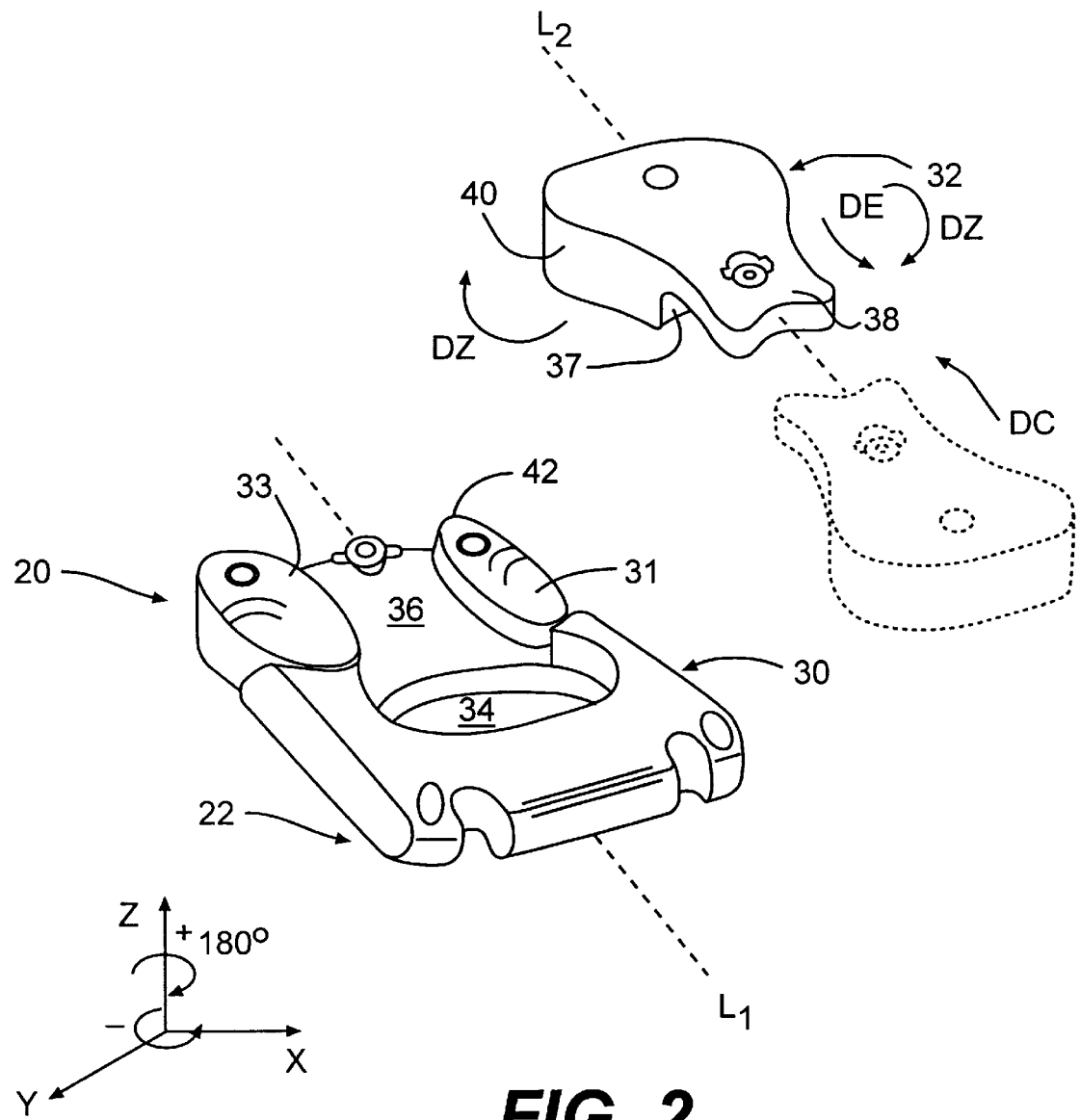
FIG. 2 is a perspective, exploded view of the ballast fillable base of the invention shown in FIG. 1 illustrating the dual tank construction of the base.

As shown in FIG. 2, primary ballast fillable tank 30 and secondary ballast fillable tank 32 each have an exterior contour configured for cooperative engagement with the other. As will be discussed in greater detail with reference to FIGS. 3–9, primary ballast fillable tank 30 has a substantially central opening 34 extending completely through primary ballast fillable tank 30 and an indentation 36 forming a reduced depth section extending rearwardly from opening 34 to rear end 42 of primary ballast fillable tank 30. Secondary ballast fillable tank 32 has a neck 38 extending from a main body 40. Thus, secondary ballast fillable tank 32 can be nested in the rearward exterior contour of primary ballast fillable tank 30 in the assembled position, as shown in FIG. 1.

Primary ballast fillable tank has a first longitudinal axis $L_1$, and secondary ballast fillable tank 32 has a second longitudinal axis $L_2$. Axes $L_1$ and $L_2$ preferably are substantially parallel to each other in both the compact and expanded positions. When secondary ballast fillable tank 32 is disposed in the expanded position it is disposed in a first direction $D_E$ along longitudinal axis $L_2$. When arranged in the compact position, as shown by broken lines in FIG. 2, secondary ballast fillable member 32 is positioned in a second direction $D_C$ along longitudinal axis $L_2$, opposite to the first direction $D_E$. One way to reposition secondary ballast fillable tank 32 is by rotating the same ±180° around the z-axis as shown schematically by arrows $D_Z$.

Thus, the exterior contours of primary ballast fillable tank 30 and secondary ballast fillable tank 32 are particularly unique because they are formed such that secondary ballast fillable tank 32 can be positioned for nesting in primary ballast fillable tank 32 in either: 1) the assembled position as shown in FIGS. 1 and 7–9; or 2) in a compact position for shipping/storage, which is discussed later with reference to FIGS. 16A–16D. Therefore, primary ballast fillable tank 30 and secondary ballast fillable tank 32 may have various configurations so long as they are capable of cooperative engagement in two different ways defining an assembled position having a larger footprint for play and a compact position for shipping/storage.

Figure 3:
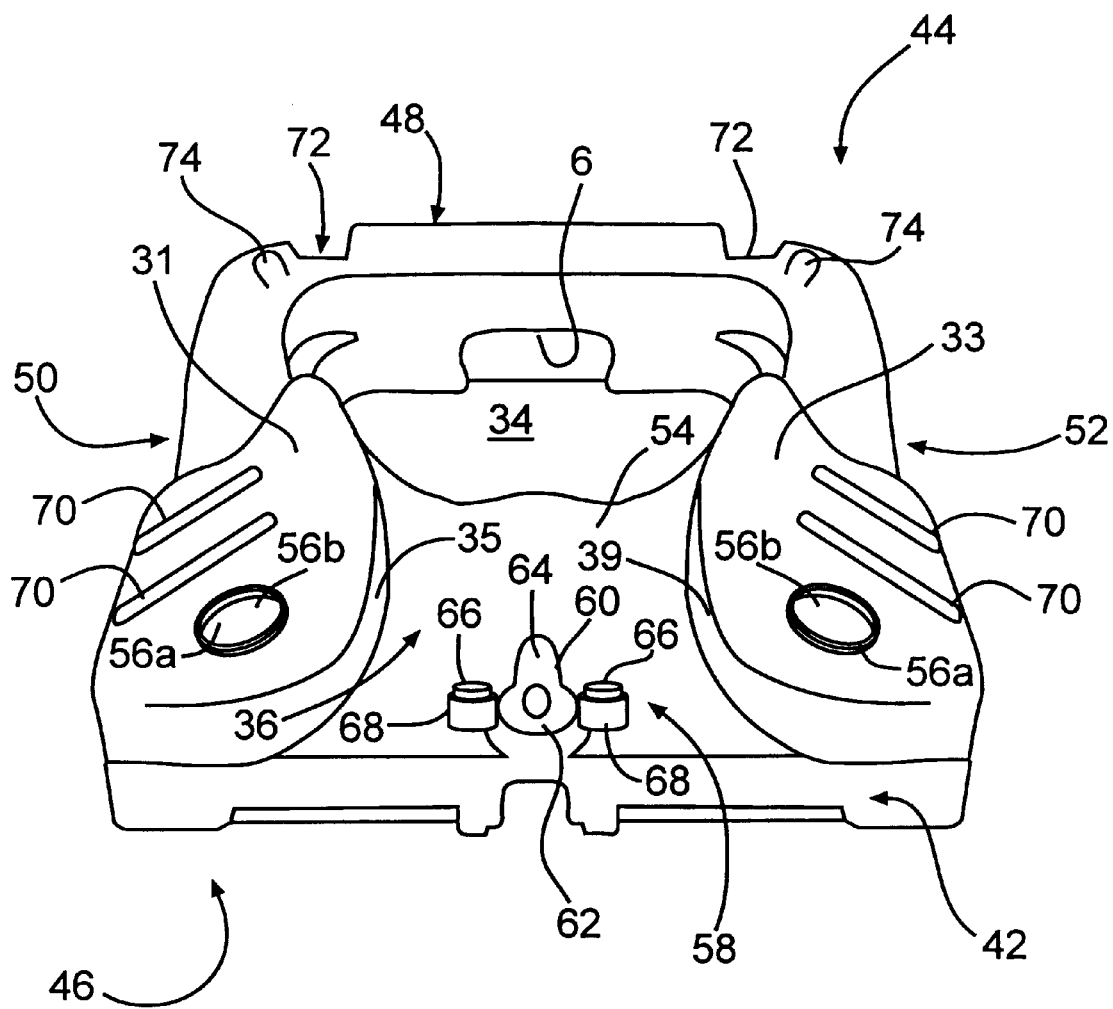
FIG. 3 is a perspective rear end view of a first tank of the two-piece ballast fillable base shown in FIG. 2.
Figure 4:
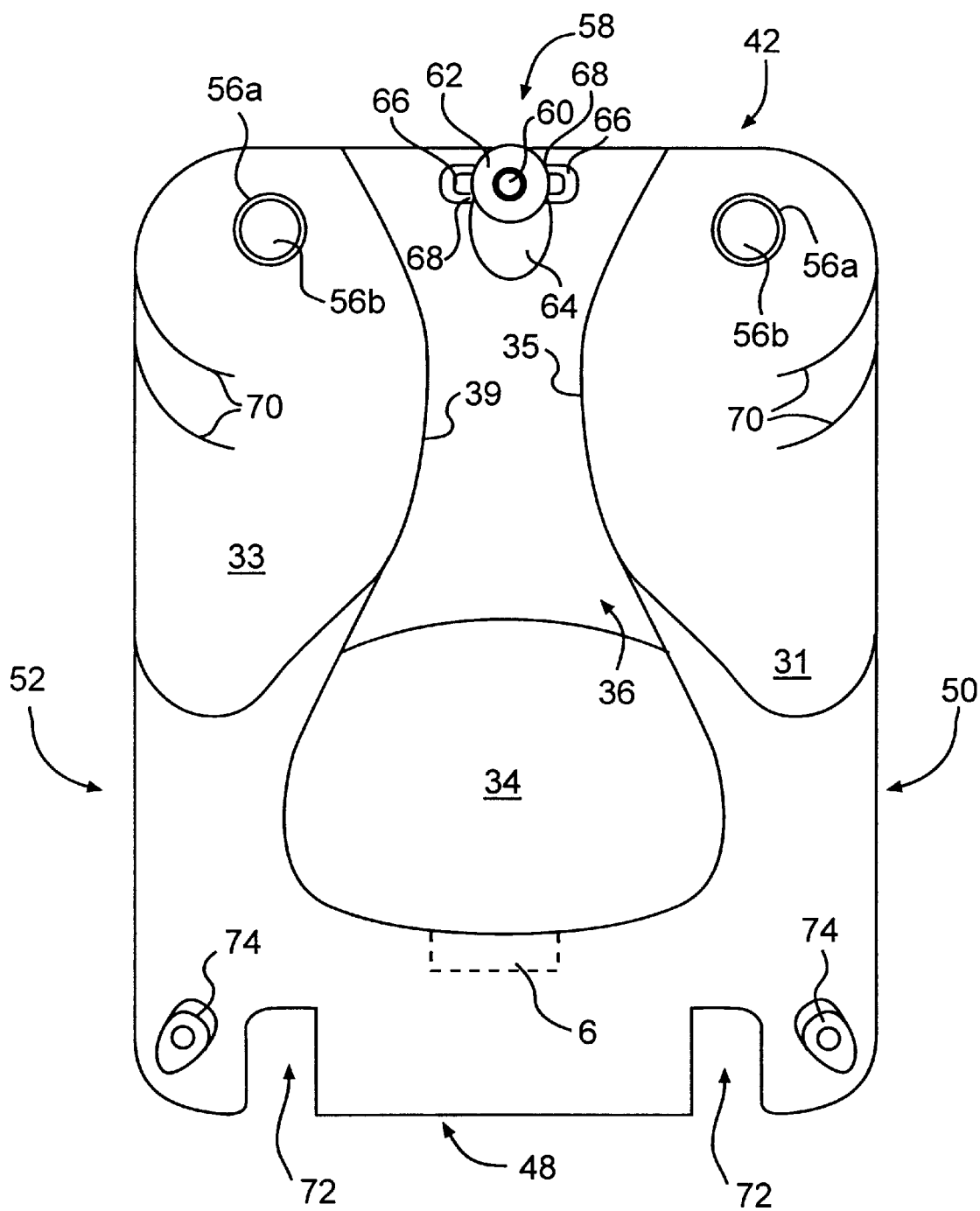
FIG. 4 is a top view of the first tank of the ballast fillable base shown in FIG. 3.

Referring now to FIGS. 3 and 4, the details of primary ballast fillable tank 30 will be discussed. Primary ballast fillable tank 30 is a hollow member having a generally rectangular cubic configuration and may be formed from polyolefin material, preferably polyethylene. The preferred method of making primary ballast fillable tank 30 is a conventional rotational molding process. Primary ballast fillable tank 30 has a top 44, a bottom 46 opposing top 44, a front end 48 opposing rear end 42, and lateral sides 50 and 52. Raised portions 31 and 33 are provided on lateral sides 50 and 52 at rear end 42.

Central opening 34 extends through primary ballast fillable tank 30 so as to be disposed more towards front end 48 than rear end 42. Opening 34 has one end that opens at top 44 and another end that opens on to bottom 46. Opening 34 forms a generally rounded cylindrical shape. Indentation 36 extends from a rear side of opening 34 towards rear end 42 of primary ballast fillable base 30, and is defined by a land 54 disposed between opening 34, rear end 42 and sides 35, 39 of raised portions 31, 33 at lateral sides 50,52 of tank 30. Primary ballast fillable tank 30 at land 54 has a depth of approximately half the depth, e.g. approximately four inches, of the remainder of primary ballast fillable tank 30 due to indentation 36. As mentioned earlier, primary ballast fillable tank 30 preferably has a depth of approximately eight inches.

Primary ballast fillable tank 30 is substantially hollow so it can be filled with ballast material, such as water or sand or other suitable material known in the art, to provide the requisite stability for system 10 during play. Accordingly, fill holes 56a having, for example, a three inch diameter provided at rear end 42 are in communication with the interior of primary ballast fillable tank 30 to allow primary ballast fillable tank 30 to be filled and emptied as necessary. Snap fit caps 56b are provided for closing fill holes 56a Any convenient number of fill holes 56a and corresponding caps 56b may be provided. The vicinity around fill holes 56a at rear end 42 of primary ballast fillable tank 30 has a slightly larger depth than front end 48 so that fill holes 56a are positioned higher than most of top 44. By doing this, primary ballast fillable tank 30 can be completely filled without the formation of an air pocket within primary ballast fillable tank 30.

In accordance with the angled and rear mounted pole 14 of this embodiment, a pole mount 58 may be formed on land 54 at rear end 42 of primary ballast fillable tank 30 to support pole 14 when secondary ballast fillable tank 32 is not utilized. For example, primary ballast fillable tank 30 may be used alone and still provide adequate stability, especially, when smaller backboards are used. However, as will be discussed later in connection with FIG. 9, when secondary ballast fillable tank 32 is utilized, pole mount 58 is only utilized for its passageway 60 extending from top 44 to bottom 46 of primary ballast fillable tank 30.

Pole mount 58 includes an inclined surface 62 that is substantially planar for engagement with the lower end of pole 14 and has a generally circular shape corresponding to the shape of pole 14, however, other shapes may be used to accommodate different shaped poles. Inclined surface 62 has a positive slope extending in a direction from front end 48 toward rear end 42. The angle of incline of inclined surface 62 generally defines the angle at which pole 14 is disposed, which preferably is twenty degrees as noted above.

Passageway 60 passes through primary ballast fillable tank 30 with one end opening centrally on inclined surface 62 and the other end opening at bottom 46 of primary ballast fillable tank 30. A slight transition area 64 is formed on a top surface of land 54 adjacent to the lower end of inclined surface 62 to facilitate alignment and placement of the lower end of basketball support pole 14 on inclined surface 62. A pair of protuberances 66 project upwardly from the top surface of land 54. Protuberances 66 are disposed one each on diametrically opposed sides of inclined surface 62. At the top of protuberance 66 is a notch 68 for receiving and supporting a pole rod 102, as will be discussed in detail later.

Front end 48 of primary ballast fillable tank 30 also includes wheel wells 72 for mounting wheels 15 on primary ballast fillable tank 30. In addition, the exterior contour of primary ballast fillable tank 30 may include recesses 74 on front end 48 of primary ballast fillable tank 30 for mounting support struts 24. Primary ballast fillable tank 30 may also include ornamental ribs 70 integrally molded in the exterior contour.

Figure 5:
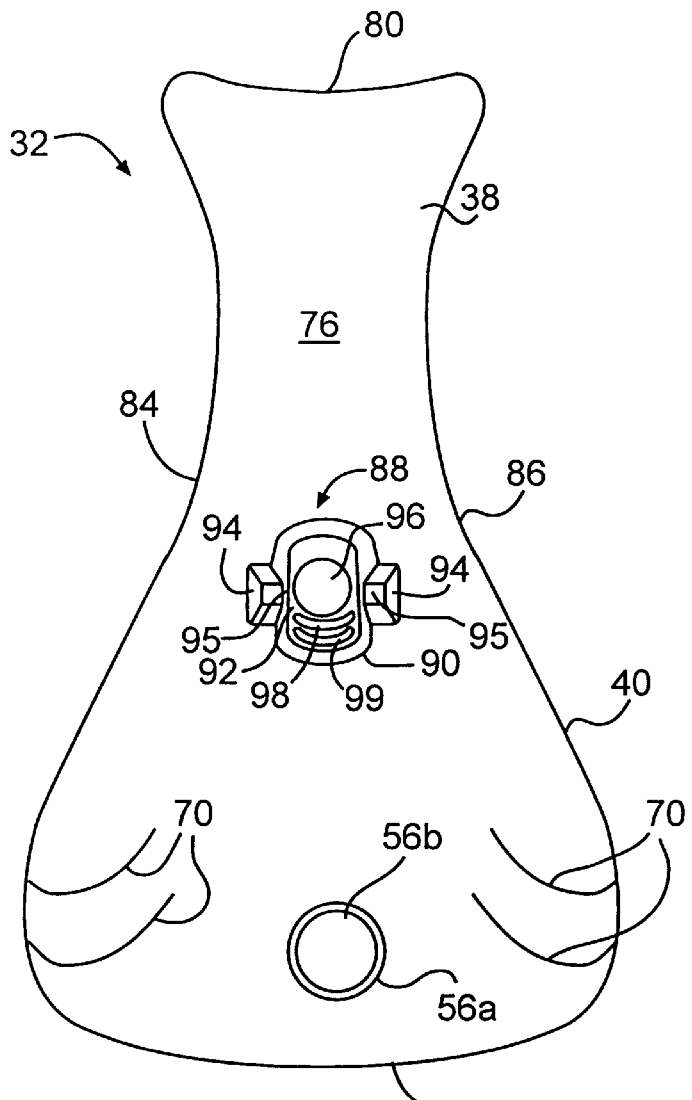
FIG. 5 is a top view of second tank of the two-piece ballast fillable base shown in FIG. 2.
Figure 6:
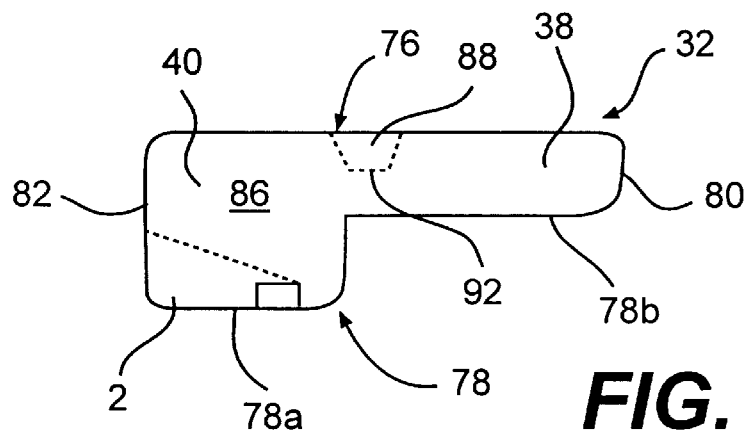
FIG. 6 is a reduced side view of the second tank of the ballast fillable base show in FIG. 5.

FIGS. 5 and 6 show a top and side view, respectively, of secondary ballast fillable tank 32, which, similar to primary ballast fillable tank 30 is a hollow molded member made from polyolefin material, preferably polyethylene using a rotational molding process. However, those skilled in the art would recognize other ways of making secondary ballast fillable tank 32 as well as primary ballast fillable tank 30.

Secondary ballast fillable tank 32 has a top 76; a bottom 78 having a bi-planar or stepped surface including a first portion 78a and a second portion 78b; opposing ends 80 and 82; and sides 84 and 86. As discussed earlier, secondary ballast fillable tank 32 generally includes main body 40 and a neck 38 extending therefrom. Main body 32 has a depth substantially equal to the depth of primary ballast fillable tank 30, approximately eight inches, and neck 38 has approximately one-half the depth of main body 32.

Centrally disposed on top 76 of secondary ballast fillable tank 32 is a pole mount 88 for mounting pole 14 as shown in FIG. 1. Pole mount 88 includes a substantially cylindrical recess 90 having a side wall that tapers inwardly from top 76 toward bottom 78. At the bottom of recess 90 is an inclined surface 92 that tapers downwardly in the direction from end 82 toward end 80. Similar to primary ballast fillable tank 32, surface 92 is inclined at an angle Generally defining the angle of incline of pole 14, which is preferably approximately twenty degrees.

Figure 10:
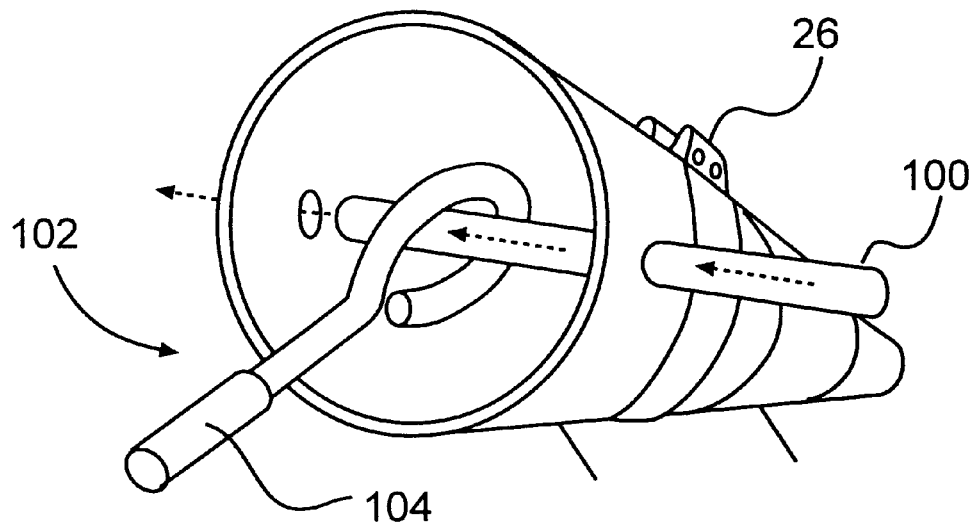
FIG. 10 is a perspective view of the lower end of a support pole and some of the hardware used to connect the lower end of the pole to the ballast fillable base shown in FIG. 1.
Figure 11:
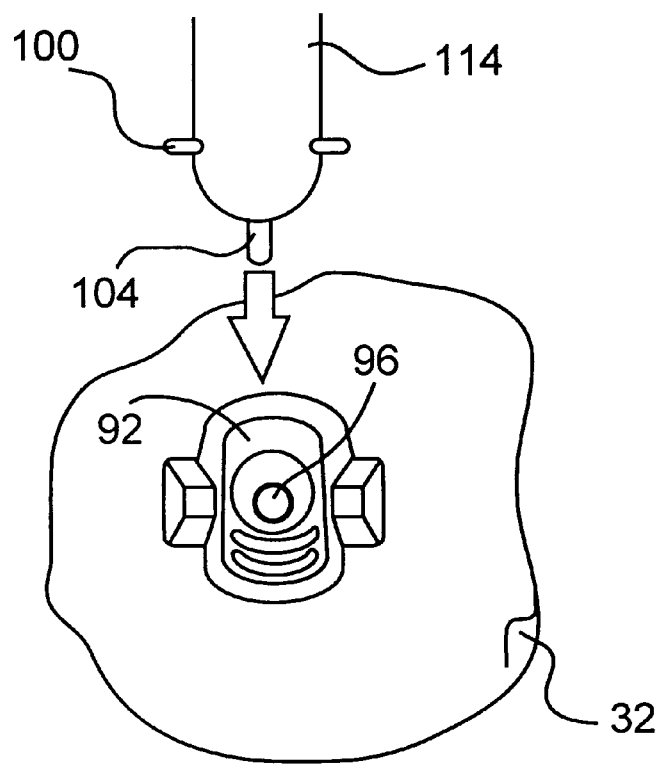
FIG. 11 is a top view of a portion of the second tank of the ballast fillable base shown in FIG. 5 illustrating positioning of the pole end shown in FIG. 10 in the pole mount.

On diametrically opposed sides of recess 90 are cut-away portions 94 each having a bottom surface 95 that is raised slightly above inclined surface 92. Bottom surface 95 is raised above inclined surface 92 approximately to the same extent that pole 14 extends beyond pole rod 100 as illustrated in FIGS. 10 and 11. Bottom 95 of cut-away portions 94 is curved to form a pivot point engageable with pole rod 100 to pivotally mount pole 14 on base 12, as discussed later with reference to FIGS. 10 and 11. As such a pair of arcuate ribs 98 and 99 are formed on incline surface 92 to facilitate alignment and positioning of the lower end of either a 3 inch pole or a 3½ inch pole, which are the most commonly used pole sizes. The wall of a 3½ inch pole would be positioned between rib 99 and the sidewall of recess 90, whereas the sidewall of a 3 inch pole would be positioned between ribs 98 and 99. The shape and positioning of ribs 98, 99 can be changed to accommodate different size poles.

A passageway 96 passes through secondary ballast fillable tank 32 and has one end opening onto inclined surface 92 and the other end opening at bottom 78 of secondary ballast fillable tank 32 for purposes of connecting pole 14 to base 12 as discussed later. Similar to primary ballast fillable tank 30, secondary ballast fillable tank 32 includes one or more ballast fillable holes 56a and caps 56b.

Figure 7:
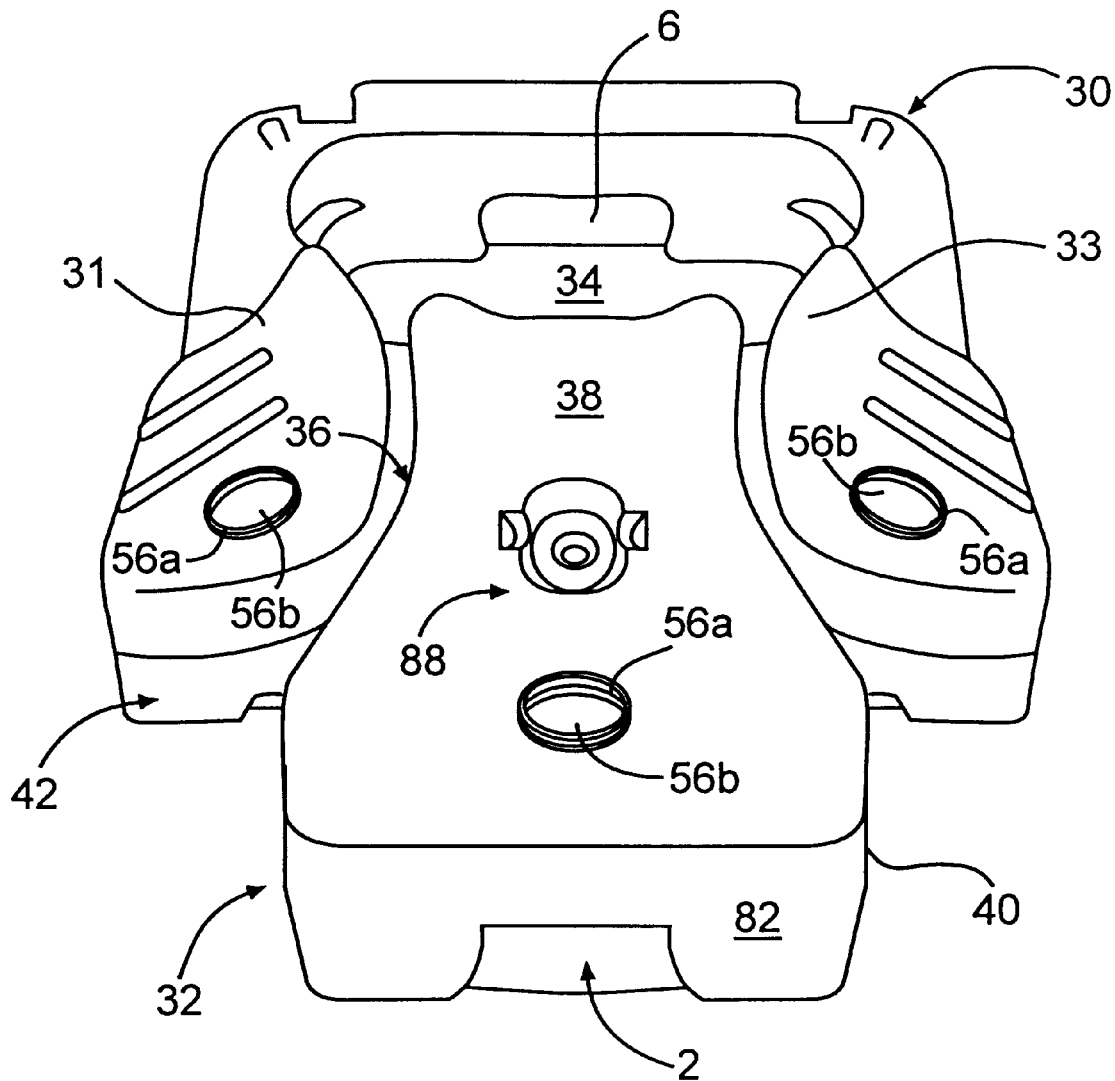
FIG. 7 is a rear end perspective view of the assembled ballast fillable base shown in FIG. 1.
Figure 8:
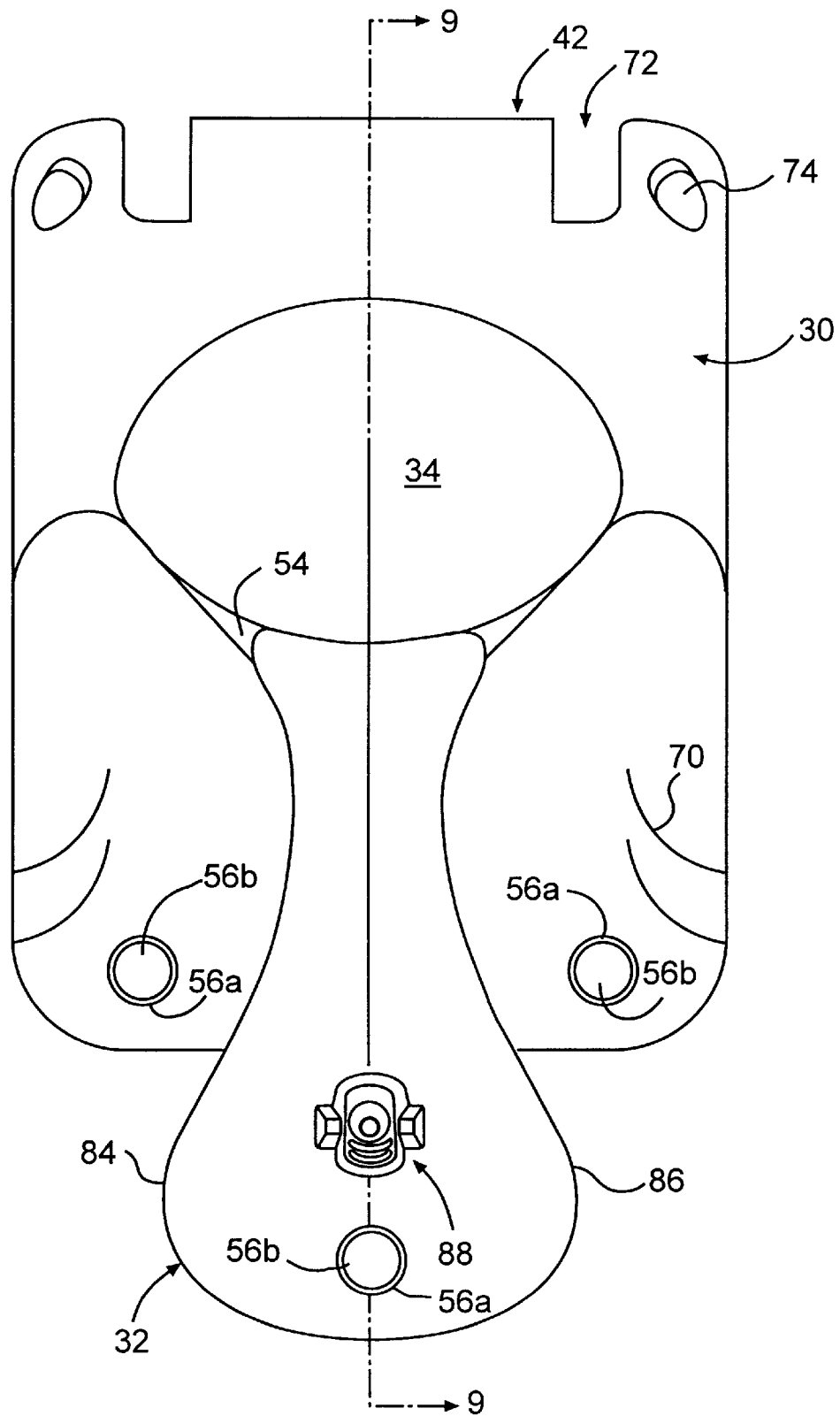
FIG. 8 is a top view of the assembled ballast fillable base shown in FIG. 1.
Figure 9:
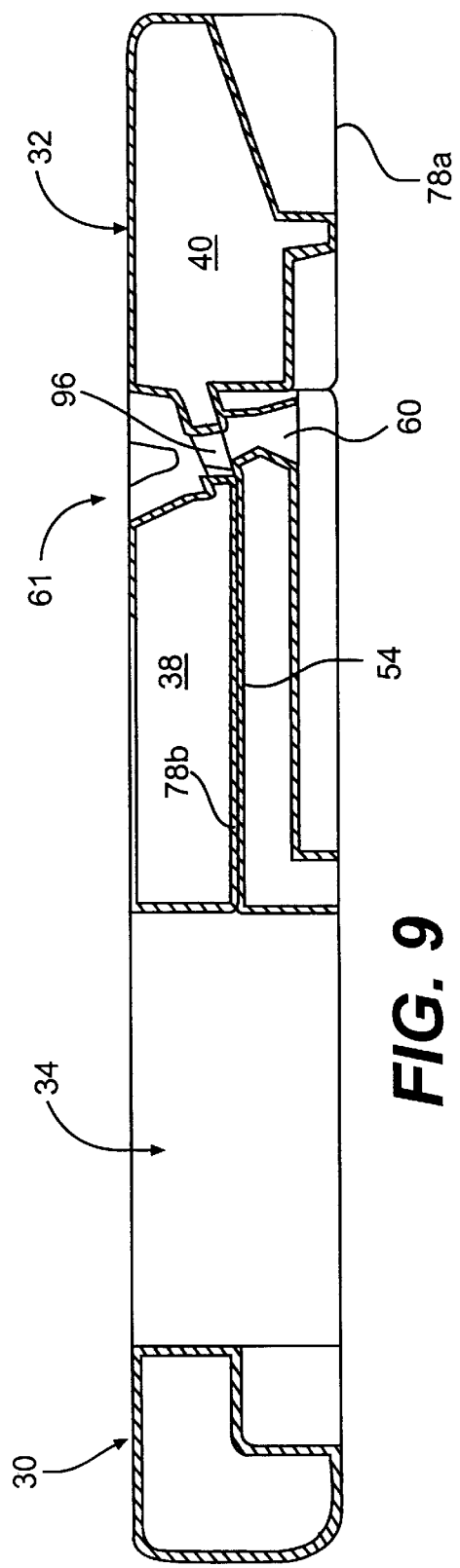
FIG. 9 is a cross-sectional view of the ballast fillable base taken along line 9—9 in FIG. 8.

Referring to FIGS. 7–9, the details of the assembled position of ballast fillable base 12 shown in FIG. 1 will be discussed. When arranged in the assembled position shown in FIG. 1, neck 38 of secondary ballast fillable tank 32 is nested in indentation 36 of primary ballast fillable tank 30. Specifically, second portion 78b of bottom 78 of secondary ballast fillable tank 32 contacts the top surface of land 54 at indentation 36 of primary ballast fillable tank 30. Sides 84 and 86 of secondary ballast fillable tank 32 are received and retained between sides 35 and 39 of raised portions 31 and 33 of primary ballast fillable tank 30. Shoulder 37 of secondary ballast fillable tank 32 rests against rear end 42 of primary ballast fillable tank 30 such that main body 40 of secondary ballast fillable tank 32 extends beyond rear end 42 of primary ballast fillable tank 30. As illustrated in the cross sectional view of FIG. 9, in the assembled position, second ballast fillable tank 32 extends beyond an outer periphery of rear end 42 of primary ballast fillable tank 30.

As further illustrated in the cross section view of FIG. 9, when secondary ballast fillable tank 32 is rearwardly disposed on primary ballast fillable tank 30, passageway 60 of pole mount 58 of primary ballast fillable tank 30 is alignable with passageway 96 of pole mount 88 of secondary ballast fillable tank 32. Accordingly, a contiguous passageway shown generally at 61 in FIG. 9, defined by passageways 60 and 96 extends through ballast fillable base 12 in the assembled position for receiving and retaining pole 14 to facilitate mounting of pole 14 and connection of secondary ballast fillable tank 32 to primary ballast fillable tank 30 as will now be discussed with reference to FIGS. 10–13.

During assembly, pole rod 100 is passed through the cross section of pole 14 via an opening on one side of the lower end of basketball support pole 14, then is passed through an eye of an eye bolt 102, and finally is passed through an other opening in pole 14, which is diametrically opposed to the one opening. Pole 14 is then ready to be mounted on either pole mount 58 on primary ballast fillable tank 30 or pole mount 88 on secondary ballast fillable tank 32 depending upon the size of system 10 and the load that ballast fillable base 12 will have to support For purposes of this discussion, pole mount 88 of secondary ballast fillable tank 32 is discussed, however, the mounting of pole 14 on pole mount 58 is substantially similar except that only primary ballast fillable tank 30 is used.

With reference to FIG. 11, threaded end 104 of eye bolt 102 is passed through passageway 96 in secondary ballast fillable tank 32 and then continues on to pass through passageway 60 in primary ballast fillable tank 30 until the two ends of pole rod 100 which extend outwardly from pole 14 come to rest on bottom surface 95 of cut-away portions 94.

Figure 12:
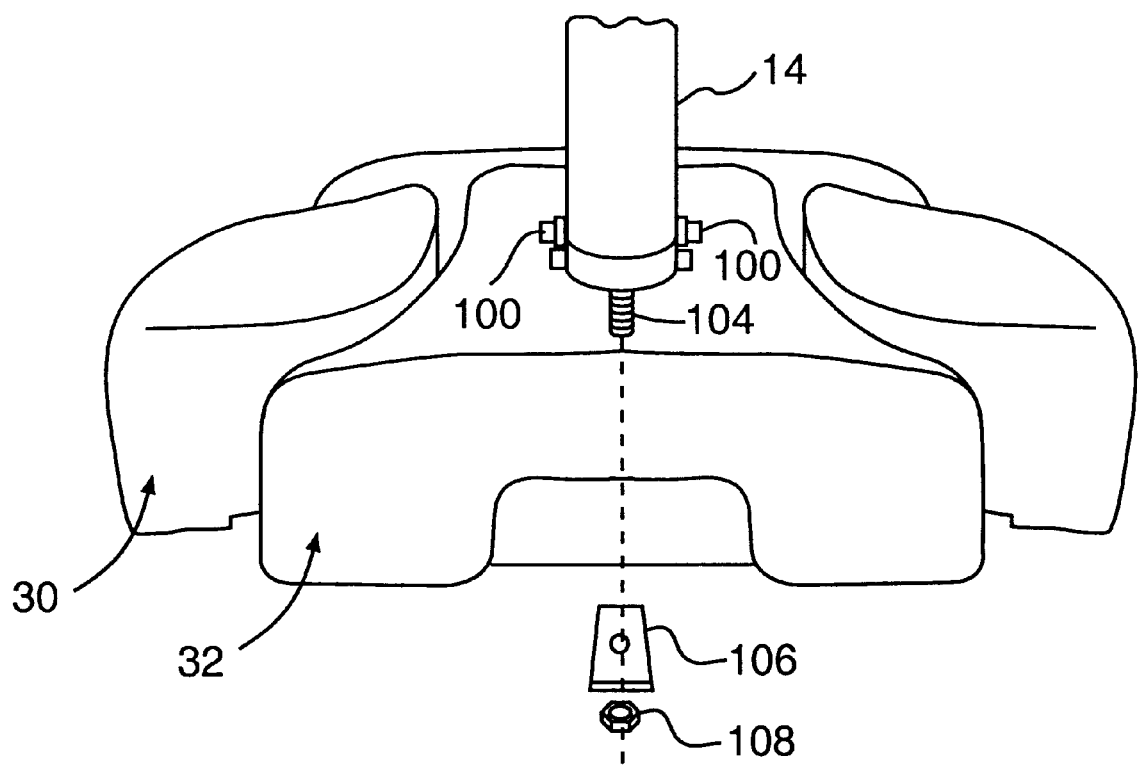
FIG. 12 is a rear end perspective view of the ballast fillable base shown in FIG. 1 illustrating the connection of the support pole thereto.
Figures 13, 14:
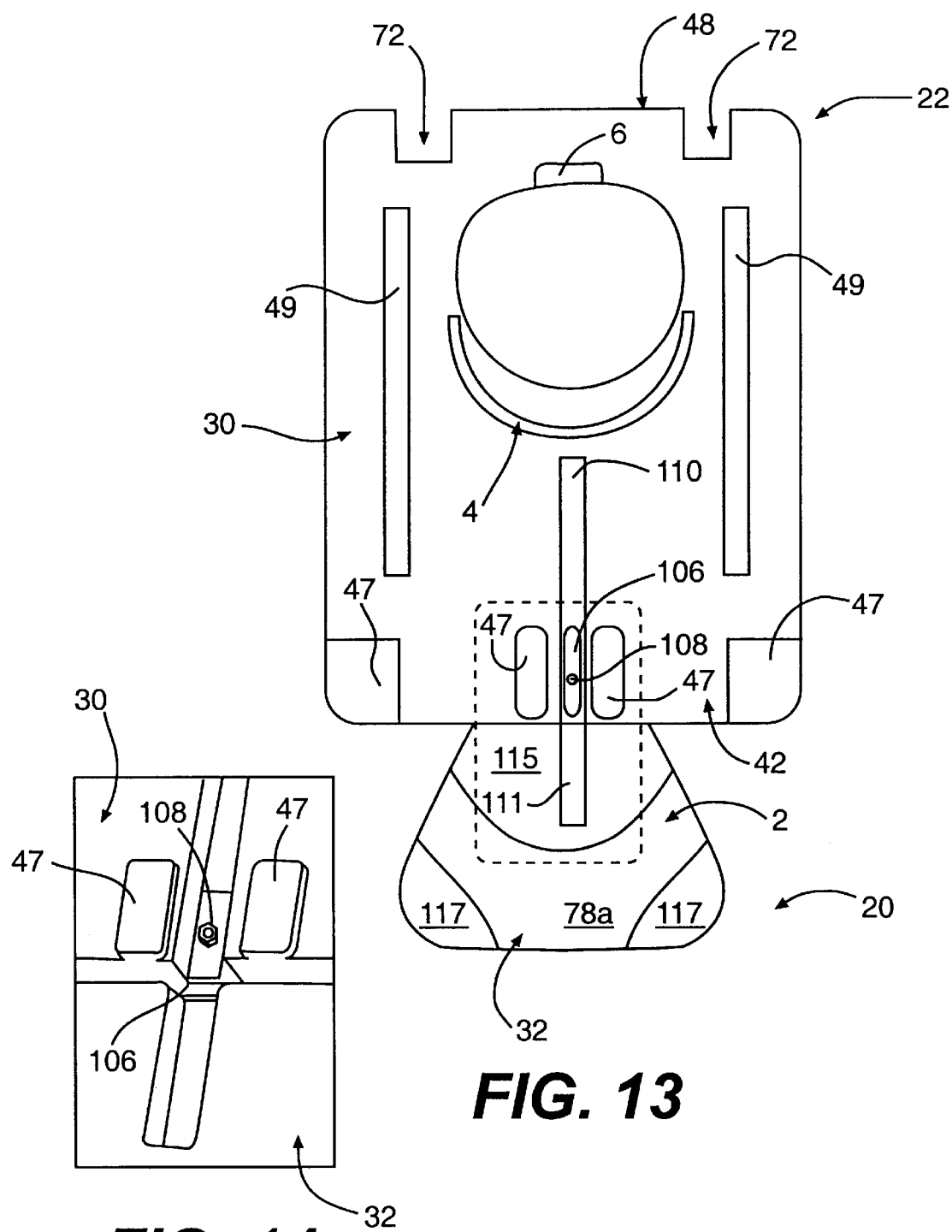
FIG. 13 is a bottom view of the ballast fillable base shown in FIG. 1.
FIG. 14 is an enlarged perspective view of the broken-line area of the base shown in FIG. 13.

As shown in FIGS. 12–14, once pole 14 is in position, threaded end 104 of eye bolt 102 may be secured to ballast fillable base 12 by a plate 106 and nut 108, which attach, sequentially, to threaded end 104 of eye bolt 102. By tightening nut 108, pole 14, secondary ballast fillable tank 32, and primary ballast fillable tank 30 are secured together. Recess 110 also serves to hold plate 106 in position when nut 108 is tightened on threaded end 104 of eye bolt 102. Of course, pole 14, primary ballast fillable tank 30 and secondary ballast fillable tank 32 may be secured together in different combinations or by other conventional apparatus.

Figure 15:
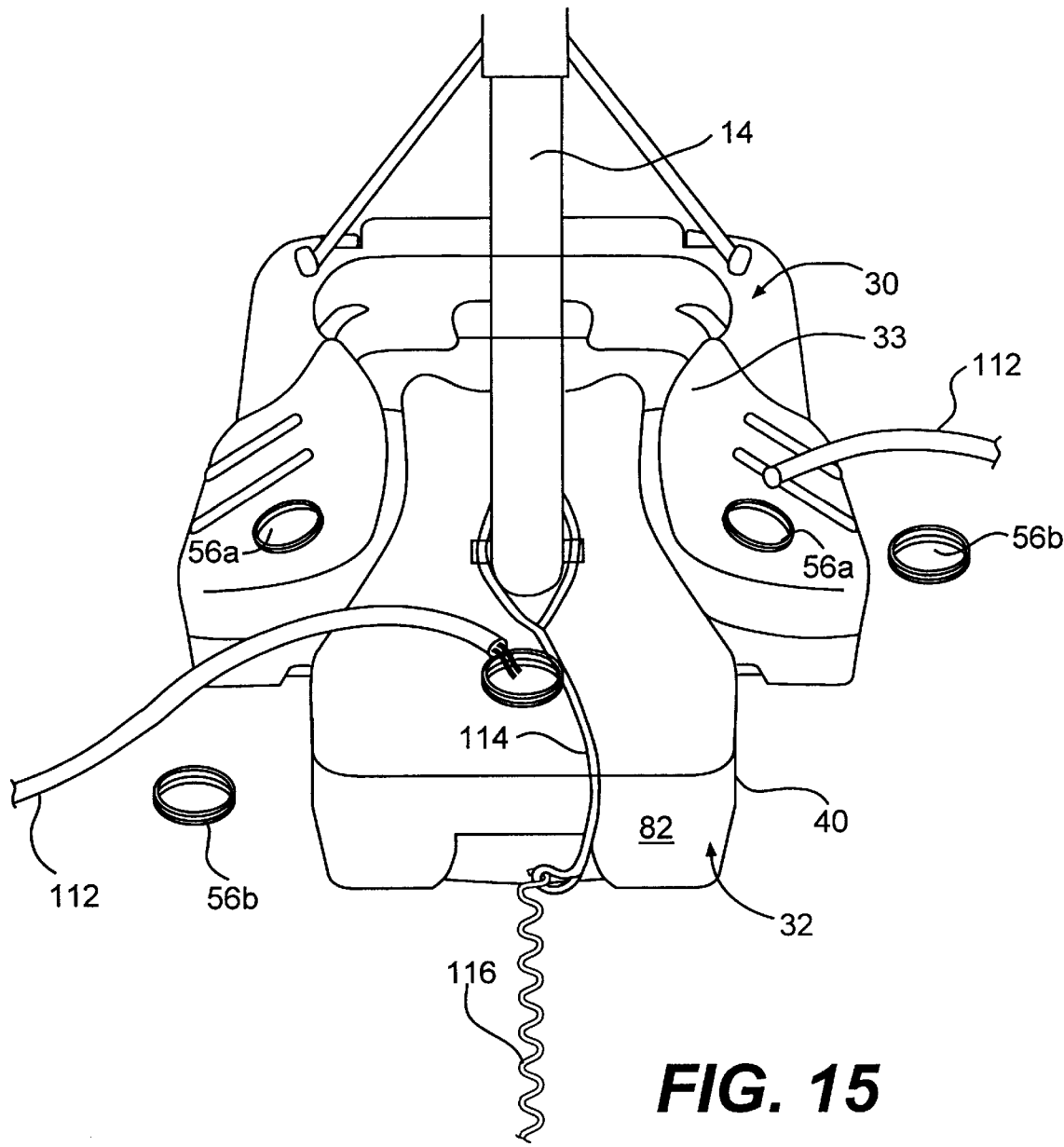
FIG. 15 is a rear perspective view of the portable basketball system shown in FIG. 1 being filled with ballast and illustrating the rope and tie-down stake used to secure the assembly to the ground.

FIG. 15 illustrates utilizing hoses 112 to fill primary ballast fillable tank 30 and secondary ballast fillable tank 32 with water via fill-holes 56a. In combination, primary ballast fillable tank 30 and secondary ballast fillable tank 32 will hold approximately 24–34 gallons of water or approximately 300–375 pounds of sand. After filling both primary ballast fillable tank 30 and secondary ballast fillable tank 32, snap caps 56b are fit into fill holes 56a seal primary ballast fillable tank 30 and secondary ballast fillable tank 32. Portable basketball system 10 may include a secondary restraint system such as a ground stake to further secure system 10 to the ground. As shown, the secondary restrain ground stake includes rope 114 and stake 116. With the use of this secondary restraint system, system 10 has approximately a 275 pound pullover force when primary ballast fillable tank 30 and secondary ballast fillable tank 32 are filled with water.

Figure 16D:
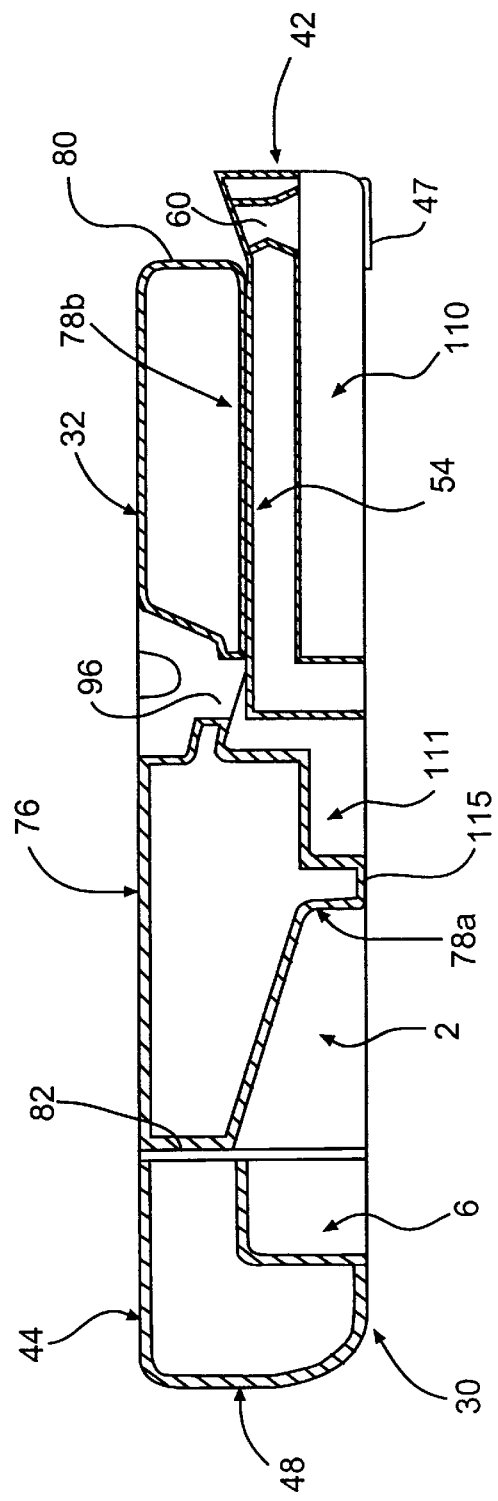
FIG. 16D is a cross sectional view taken along line 16D—16D shown in FIG. 16B.
Figure 16A:
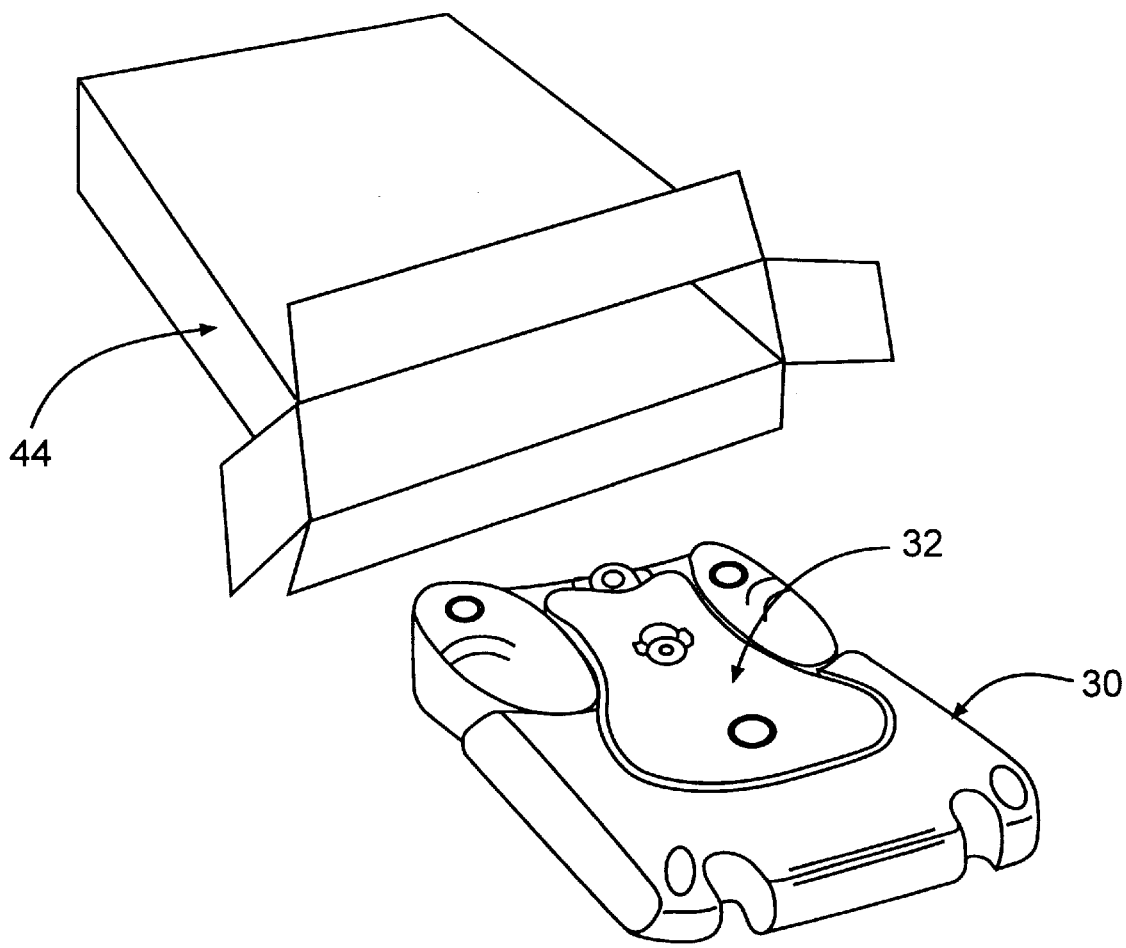
FIG. 16A is a perspective view of the ballast fillable base shown in FIG. 2 illustrating a compact arrangement for disposition in a relatively flat container.
Figure 16B:
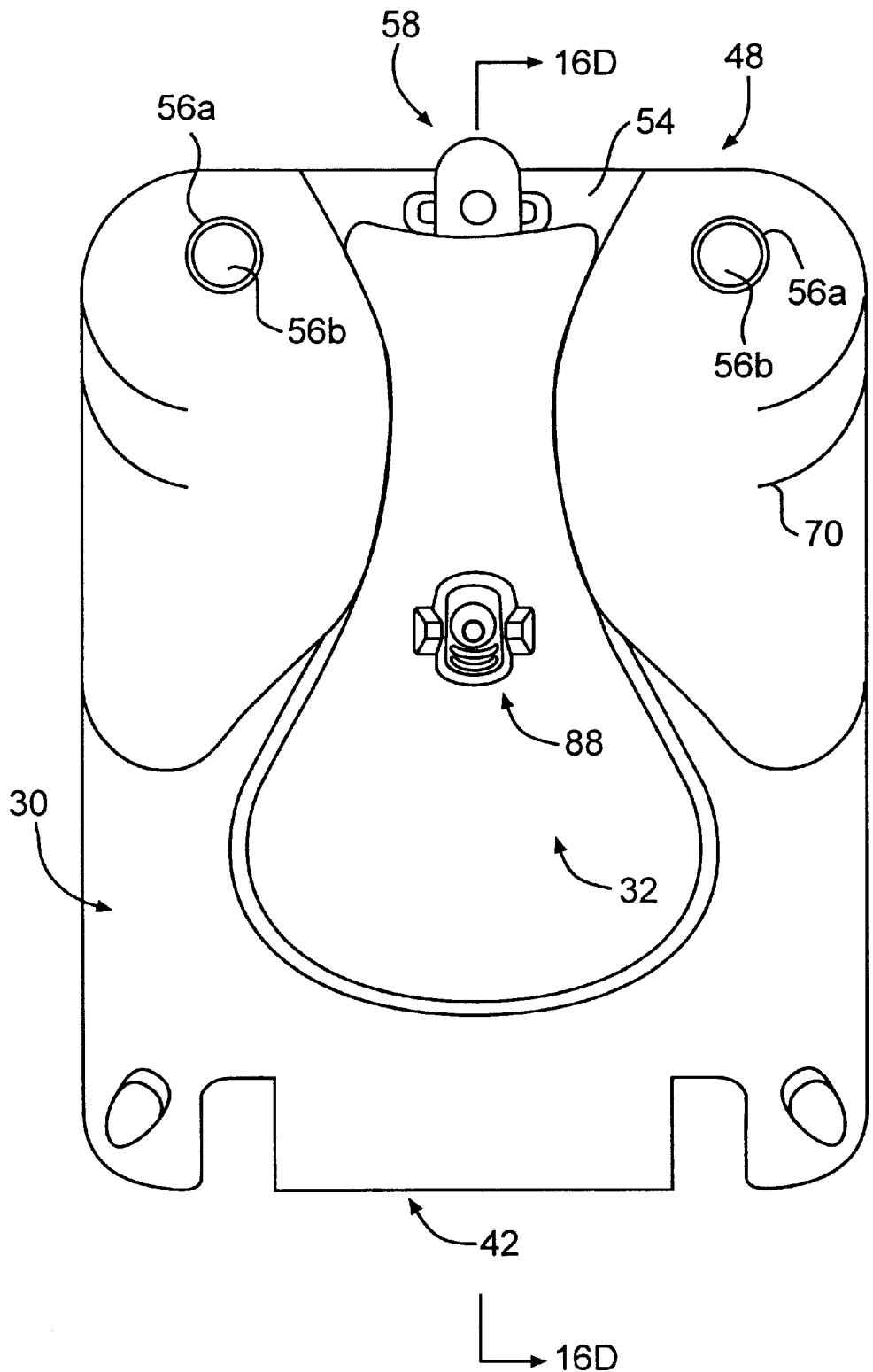
FIG. 16B is a top view of the ballast fillable base as shown in FIG. 16A.

In another aspect of the invention, secondary ballast fillable tank 32 is removable from primary ballast fillable tank 30, and is cooperatively engageable in a second, more compact position especially adapted for shipping or storage as shown in FIGS. 16A–16D. As illustrated in FIGS. 16A and 16B, main body 40 of secondary ballast fillable tank 32 is received in opening 34 of primary ballast fillable tank 30; and neck 38 of ballast fillable tank 32 rests on land 54 between raised sections 31, 33 of primary ballast fillable tank 30. In other words, as discussed earlier with reference to FIG. 2, to change between the assembled and the compact positions, second ballast fillable tank 32 is simply moved between an orientation in the first direction $D_E$ and an orientation in the second direction $D_C$, for example, by rotating the same ±180 degrees around the z-axis. Thus, the compact position has a smaller footprint than the expanded assembled arrangement shown in FIG. 1 because second ballast fillable tank 32 is disposed substantially within the exterior contour and dimensions of primary ballast fillable tank 30, rather than extending outwardly therefrom as in the assembled position. In other words, in the compact position, the length, width and depth defining the cubic volume of space occupied by primary ballast fillable tank 30 is not substantially increased, if at all, when secondary ballast fillable tank 32 is nested within the profile of primary ballast fillable tank 30. Ballast fillable base 12 has, for example, a cubic dimension of approximately 14.58 feet$^3$, which due to nesting of secondary ballast fillable tank 32 is defined substantially or entirely by the cubic volume of primary ballast fillable tank 30. Accordingly, in the compact position, ballast fillable base 12 can be stored and shipped in a smaller amount of space and, in particular, shipped in a relatively flat container shown generally at 44, which preferably has a height just large enough to accommodate the 8" depth of tank 32 and any other components placed above or below base 12.

Figure 16C:
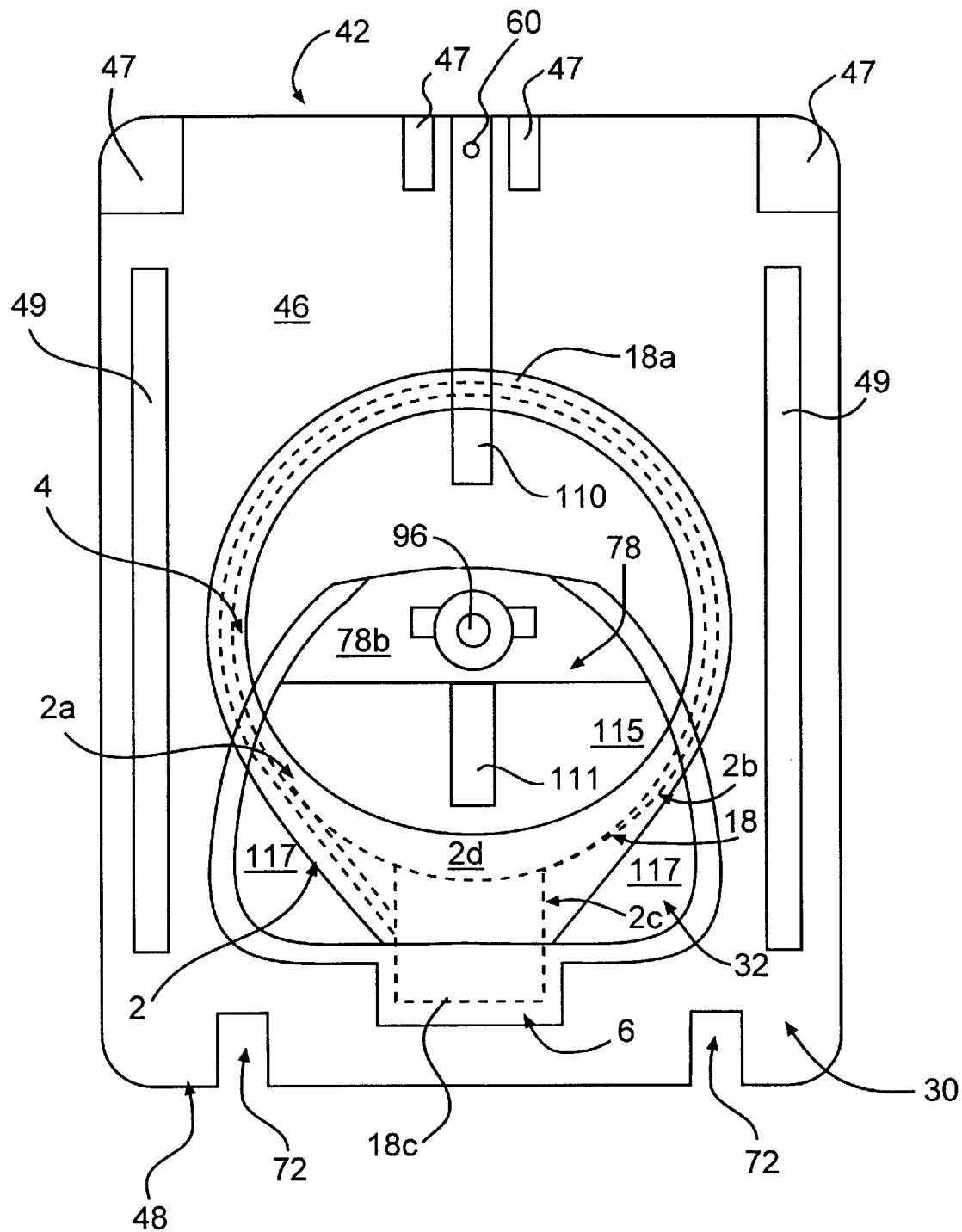
FIG. 16C is a bottom view of the ballast fillable base as shown in FIG. 16A.

To further reduce the shipping volume, bottom 46 of primary ballast fillable tank 30 and portion 78a of bottom 78 of secondary ballast fillable tank 32 may be configured to nest goal 18 therein during shipping/storage, as illustrated in FIGS. 16C and 16D. In particular, bottom 46 of primary ballast fillable tank 30 has a substantially rectangular shaped notch 6 in central opening 34 at front end 48 of primary ballast fillable tank 30. Bottom 46 of primary ballast fillable tank 30 also has an arcuate recess 4 having a shape corresponding to the arcuate shape of rim 18a of goal 18. Arcuate recess 4 has a depth substantially equal to the depth of rim 18a of goal 18. Portion 78a of bottom 78 of secondary ballast fillable tank 32 has a substantially V-shaped recess 2 having distal ends 2a and 2b, a base end 2c and a bottom 2d. Base end 2c is alignable with notch 6 in primary ballast fillable tank 30 and has a depth substantially equal to a depth of notch 6 as illustrated in FIG. 16D. Bottom 2d of V-shaped recess 2 has a variable depth that decreases from base end 2c toward distal ends 2a and 2b as also illustrated in the cross sectional view of FIG. 16D. Distal ends 2a and 2b of V-shaped recess 2 are alignable with arcuate recess 4 on bottom 46 of primary ballast fillable tank 30. The depth and configuration of arcuate recess 4, V-shaped recess 2 and notch 6 is such that goal 18 is capable of being nested within ballast fillable base 12 for purposes of compact shipping. In particular, arms 18b extending between bracket 18c and rim 18a of goal 18 are nested in V-shaped recess 2; bracket 18c of goal 18 is nested in notch 6 and base end 2c of V-shaped recess 2; and rim 18 is nested in arcuate recess 4.

As shown best in FIGS. 13, 14 and FIG. 16D, bottom 46 of primary ballast fillable tank 30 includes raised surfaces forming feet 47 at rear end 42. A pair of elongated recesses 49 extending between front end 42 and rear end 48 to provide structural rigidity to primary ballast fillable tank 30. Recess 110 also extends longitudinally and provides structural rigidity, as well as, a place for receiving pole mounting plate 106. First portion 78a of bottom 78 of secondary ballast fillable tank 32 has a recess 111 for providing structural rigidity that is alignable with recess 110 in primary ballast fillable tank 30 in the assembled position. Recess 2 defines a central foot 115 and feet 117. Feet 47 of primary ballast fillable tank 30, feet 115 and 117 of secondary ballast fillable member 32 and wheels 15 (shown in FIG. 1), if provided, form a continuous support surface which rests upon the ground or other playing surface.

Figure 17:
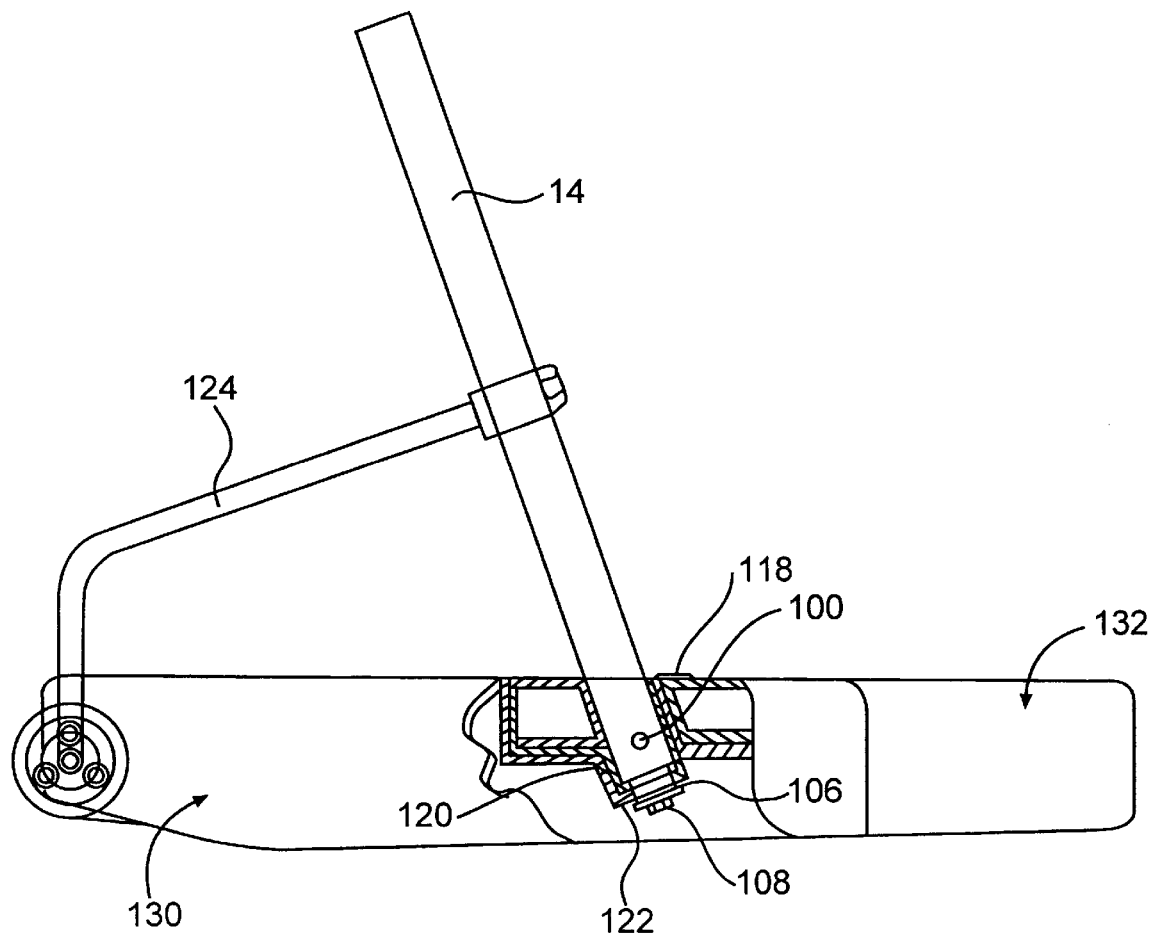
FIG. 17 is a partially cut-away side view of a portable basketball system having a pole mounting system in accordance with another embodiment of the invention.

Various other embodiments of the invention will now be discussed. Only features of the invention that differ significantly from those discussed above are described in detail. FIG. 17 shows a partially cut-away view of an alternate embodiment of the invention where ballast fillable base 12 has a modified pole mounting system. In particular, secondary ballast fillable tank 132 has an opening 118 sized to allow basketball support pole 14 to pass therethrough. Primary ballast fillable tank 130 has a recess 120 alignable with opening 118 in secondary ballast fillable tank 132. Opening 118 has cut-outs (not shown) for supporting pole rod 100 in the same manner as discussed earlier. The bottom of recess 120 includes an inclined surface 122 (again, preferably 20 degrees to the vertical) with an opening for receiving a pole connector. Pole 14 is secured to primary ballast fillable tank 130 in the same manner as discussed earlier with reference to FIGS. 10–14, however, angled supports struts 124 (only one of which is shown) are utilized. Secondary ballast fillable tank 132 is held in position by pole 14 passing therethrough.

Figure 18:
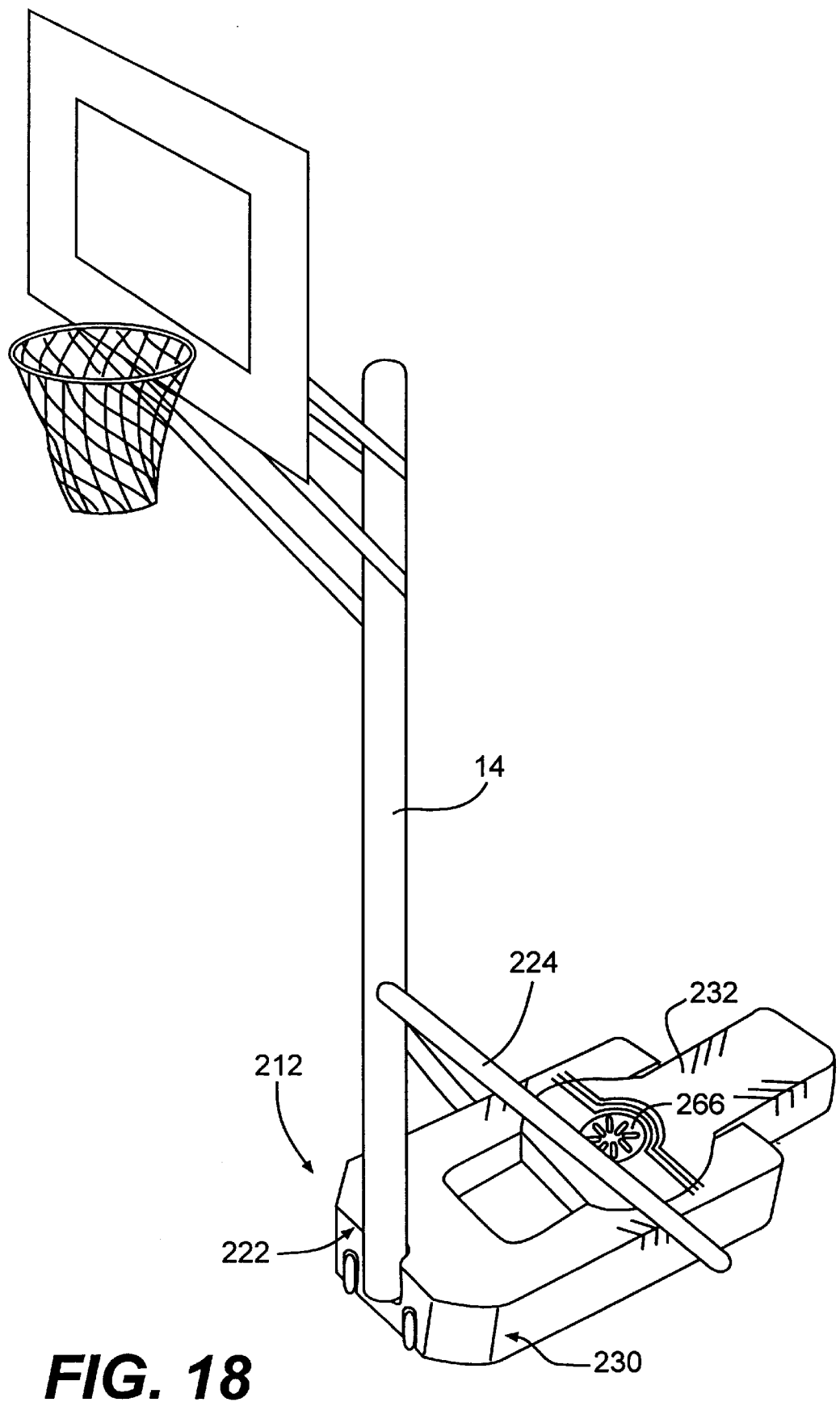
FIG. 18 is a perspective view of a portable basketball system in accordance with a further embodiment of the invention in which the pole is mounted at the front of the two-piece ballast fillable base.
Figure 19A:
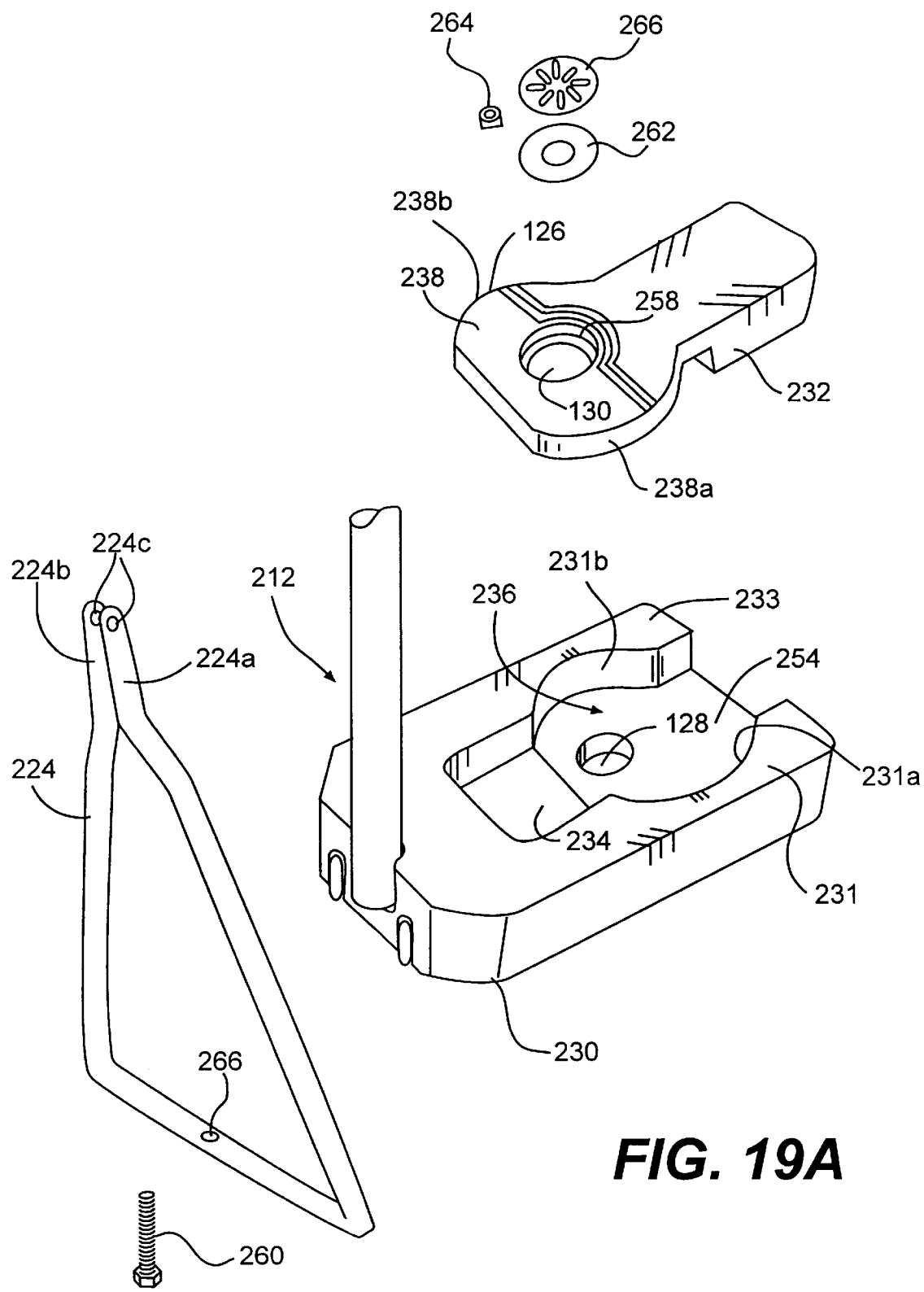
FIG. 19A is an exploded, perspective view of the two-piece ballast fillable base of the portable basketball system shown in FIG. 18.

FIGS. 18 and 19A show another embodiment of the invention where pole 14 is vertically mounted at front end 222 of two-piece ballast fillable base 212 by any conventional means and pole 14 is supported by a support arm in the form of a unitary strut 224. Primary ballast fillable tank 230 is formed with a through opening 234 and indentation 236 defined in part by arcuate concave side walls 231a and 231b, of raised base sections 231 and 233, respectively. Neck 238 of secondary ballast fillable tank 232 is formed with arcuate convex side walls 238a and 238b, which generally match the contour of base side walls 231a and 231b. Neck 236 may be fitted into indentation 236 in a first direction such that secondary ballast fillable tank 232 is nested in primary ballast fillable tank 230 (not shown). In addition, neck 236 and land 254 include alignable openings 130 and 128, respectively, which are utilized to secure secondary ballast fillable tank 232, primary ballast fillable tank 230 and strut 224 together. Opening 130 has an annular shoulder 258. An elongated threaded bolt 260 passes through opening 266 in strut 224, through opening 128 in primary ballast fillable tank 230, through opening 130 in secondary ballast fillable tank 232, and through washer 262 which rests upon shoulder 258 for connection to nut 264. However, bolt 260 may be passed through these parts in the opposite direction such that nut 264 would be on the bottom of strut 224, rather than on top of washer 262. By tightening nut 264 on bolt 260, strut 224, primary ballast fillable tank 230, and secondary ballast fillable tank 232 are secured together. The exposed washer 262, nut 264 and the end of bolt 260 on the top of secondary ballast fillable tank 232 can be covered by a cap 266. The free ends 224a and 224b of strut 224 are connected to pole 14 in any conventional manner and may include holes 224c for this purpose.

Figure 19B:
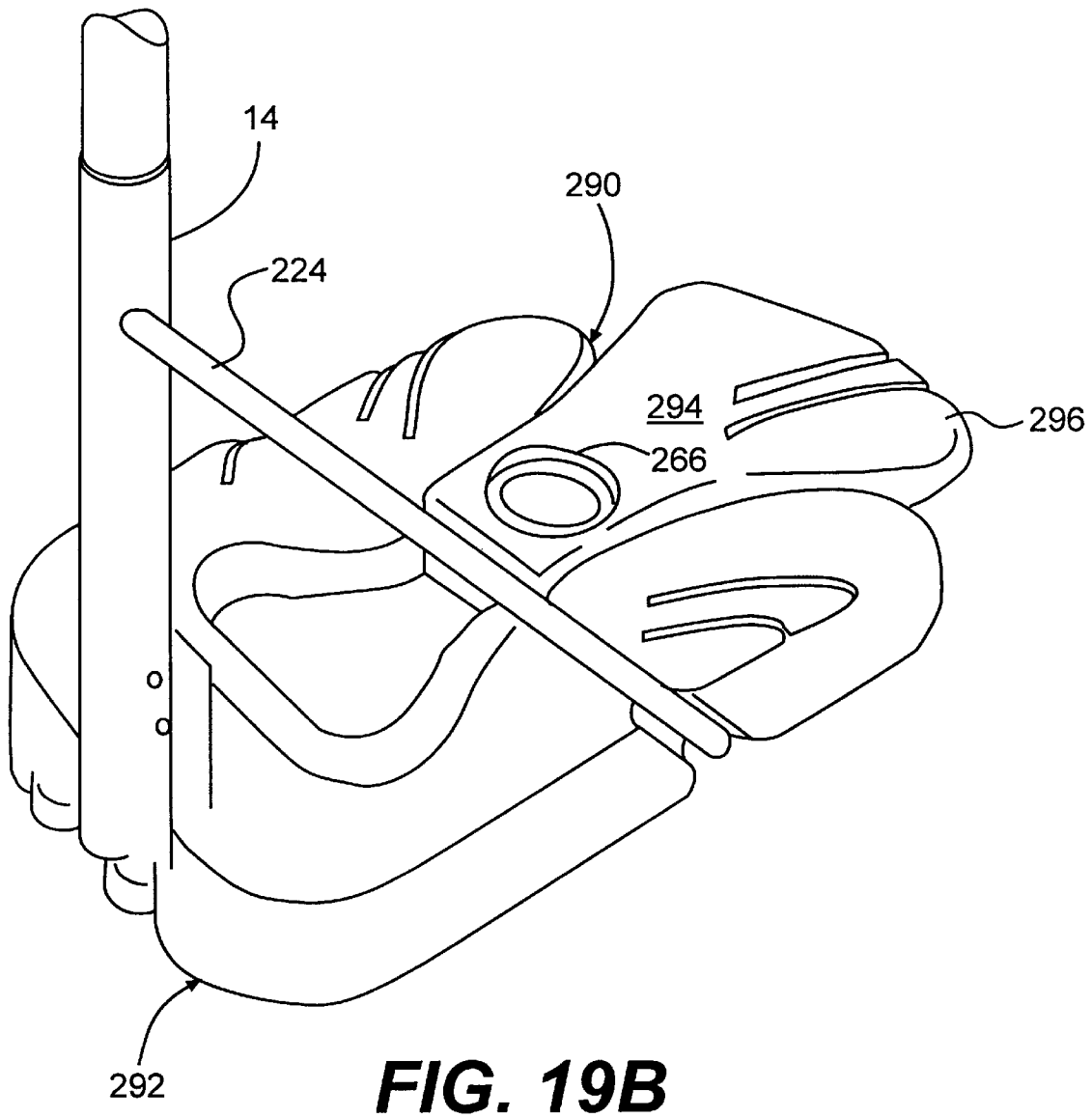
FIG. 19B is a perspective view of a portable basketball system in accordance with another embodiment of the invention where the pole is mounted at the front of the ballast fillable base.

FIG. 19B shows a variation of the embodiment of FIGS. 18 and 19A, where primary ballast fillable tank 292, including indentation 290, and secondary ballast fillable tank 296, including neck 294 are shaped similarly to the embodiment shown in FIG. 1. However, the connection features of this embodiment are similar to those discussed immediately above with reference to the FIGS. 18 and 19A embodiment and therefore need not be discussed in detail again.

Figure 20:
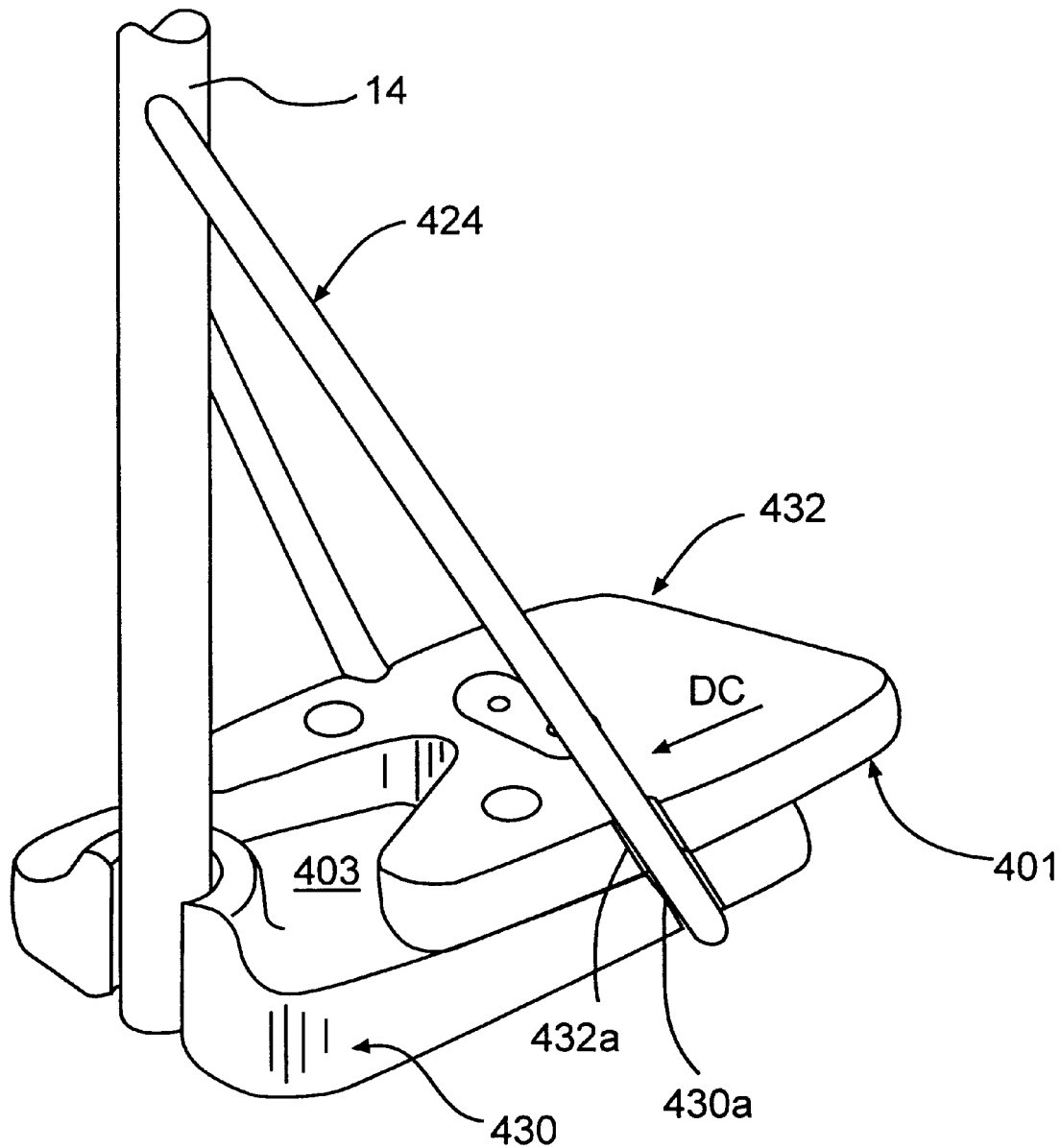
FIG. 20 is a perspective view of a further embodiment of the invention in which the pole is mounted at the front of the two-piece ballast fillable base.
Figure 21:
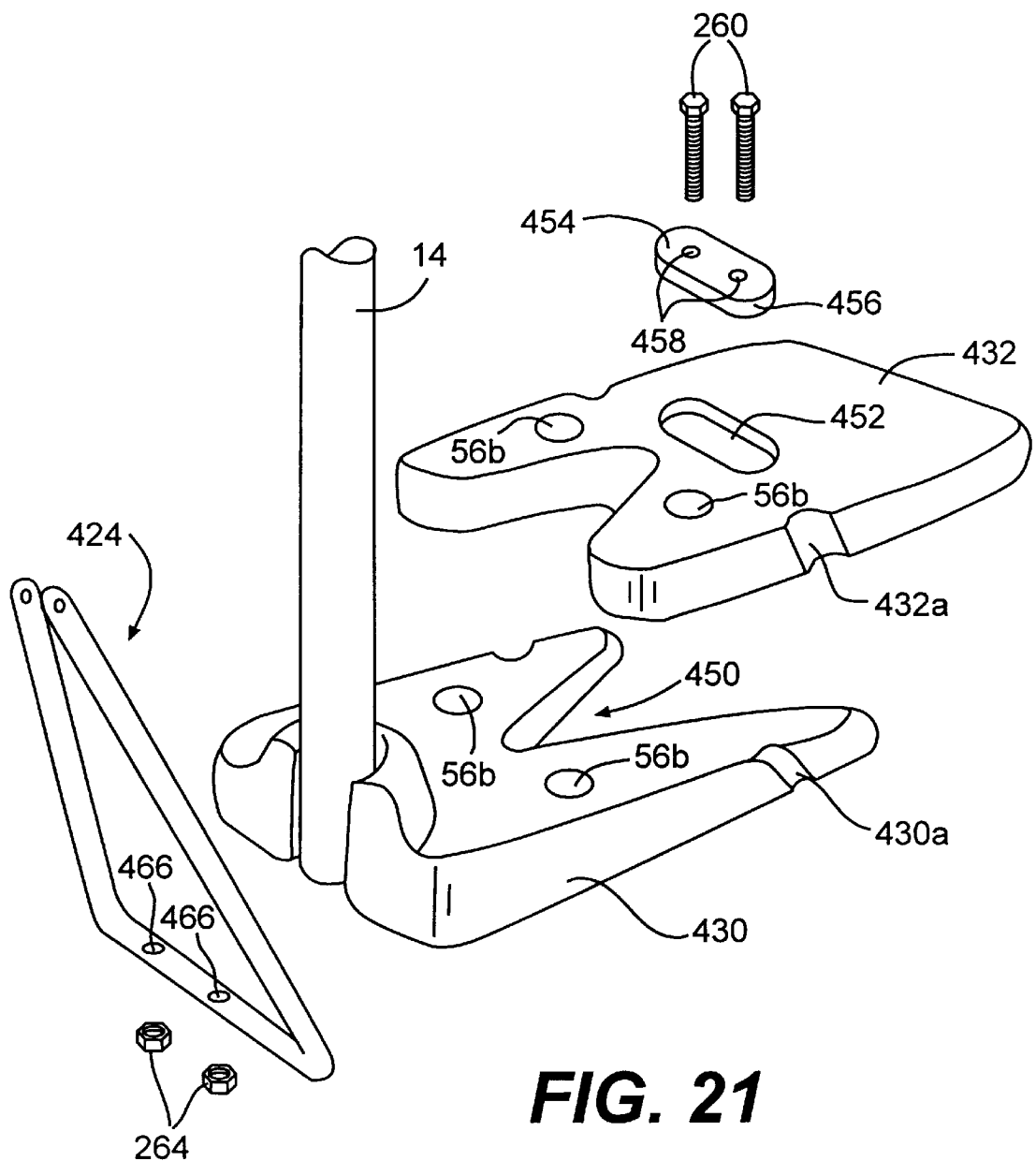
FIG. 21 is an exploded view of the ballast fillable base of the portable basketball system shown in FIG. 20.
Figure 22:
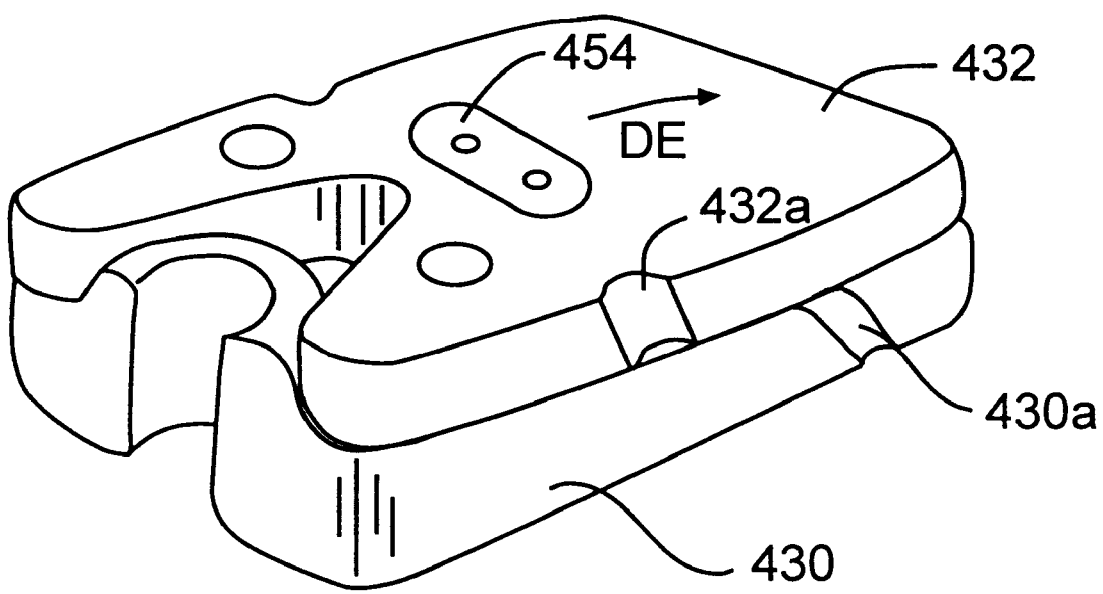
FIG. 22 is a perspective view illustrating a compact arrangement of the ballast fillable base of the portable basketball system shown in FIG. 20.

FIGS. 20–22 show another embodiment constructed in accordance with the principles of the invention where the pole is mounted at the front of a two-piece ballast fillable base, which takes the form of secondary ballast fillable tank 432 slidable relative to primary ballast fillable tank 430 between a compact shipping/storage position (FIG. 22) and an assembled, expanded position (FIG. 20). In particular, a bottom surface 401 on the bottom of ballast fillable tank 432 is slidable on top surface 403 of primary ballast fillable tank 430. Secondary ballast fillable tank 432 shown in the compact position in FIG. 22 is slidable in a first direction $D_E$ to the expanded position shown in FIG. 20. Secondary ballast fillable tank 432 shown in the expanded position in FIG. 20 is slidable in a second direction $D_C$ to the compact position shown in FIG. 22. This embodiment includes a vertically disposed pole 14.

The sides of primary ballast fillable tank 430 and secondary ballast fillable tank 432 are configured with recesses 430a and 432a to accommodate a U-shaped strut 424, which is similar to strut 224 discussed in FIGS. 18, 19A and 19B, however, includes two openings 466 for receiving two bolts 264 to connect strut 466 and primary and secondary ballast fillable tanks 430 and 432 together. In this embodiment, because primary ballast fillable tank 430 is formed with a V-shaped notch 450, an opening 452 need only be formed through secondary ballast fillable tank 432 for this connection. An insert 454 having an inclined, camming surface 456 is positionable in opening 452 and openings 458 allow bolts 260 to be passed therethrough. Similar to the previous embodiment, when nuts 264 and bolts 260 are tightened, respectively, primary ballast fillable base 430, secondary ballast fillable base 432, and strut 424 are secured together.

FIGS. 23 and 24 show an alternative of this slidable ballast tank embodiment in which secondary ballast fillable member 532 is slidable on surface 530a of primary ballast fillable tank 530 from the expanded position (FIG. 23) to the compact position (not shown); and the unitary strut 424 is replaced with a pair of L-shaped struts 524 for connecting pole 14 to flanges 550a and 551a extending respectively from each side of primary ballast fillable tank 530 and secondary ballast fillable tank 532. Struts 524 have openings 524a for connection to pole 14 and openings 524b on the other end for connection to base 512. Flanges 550a and 551a extending from secondary and primary ballast fillable tanks 532 and 530, respectively, each have three openings 550b and 551b, respectively, corresponding to openings 524b on struts 524. Openings 550b, 551b and 524b in flanges 550a and 551a, and strut 524 are alignable to receive a connector, such as a bolt (not shown), that is secured by a nut (not shown).

Figure 25:
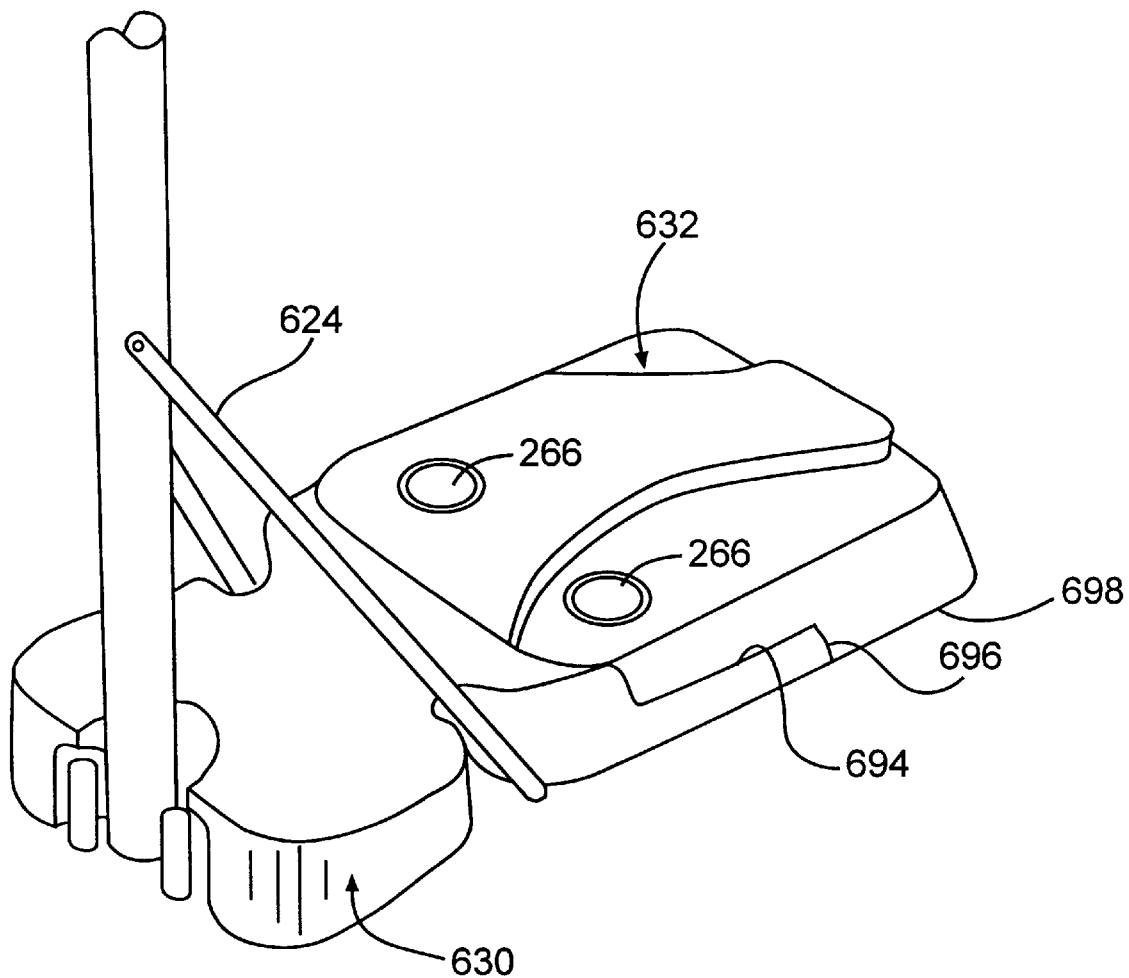
FIG. 25 is a perspective view of a portable basketball system in accordance with a further embodiment of the invention in which the pole is mounted at the front of the two-piece ballast fillable base.
Figure 26:
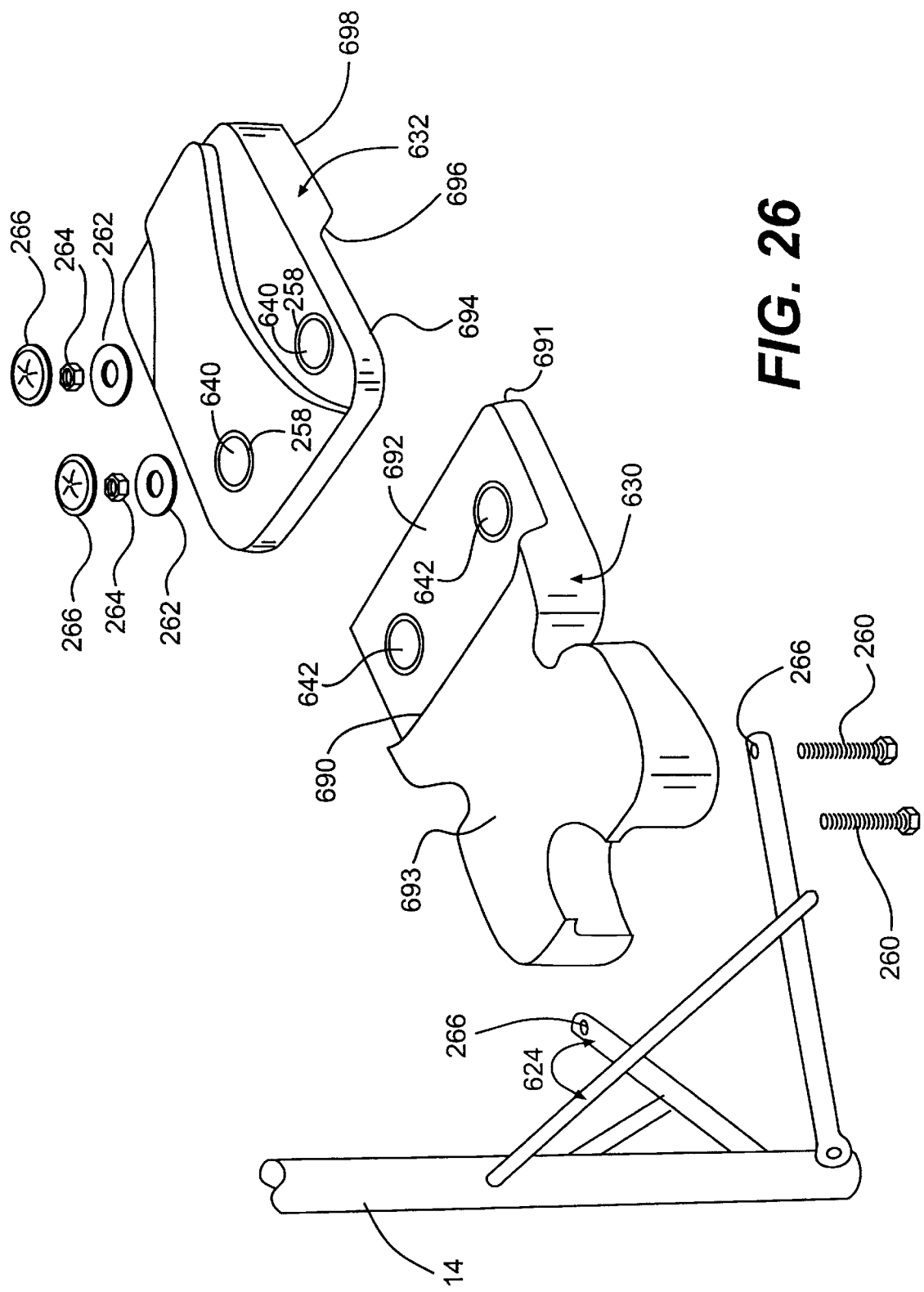
FIG. 26 is an exploded view of the two-piece ballast fillable base of the portable basketball system shown in FIG. 25.
Figure 27:
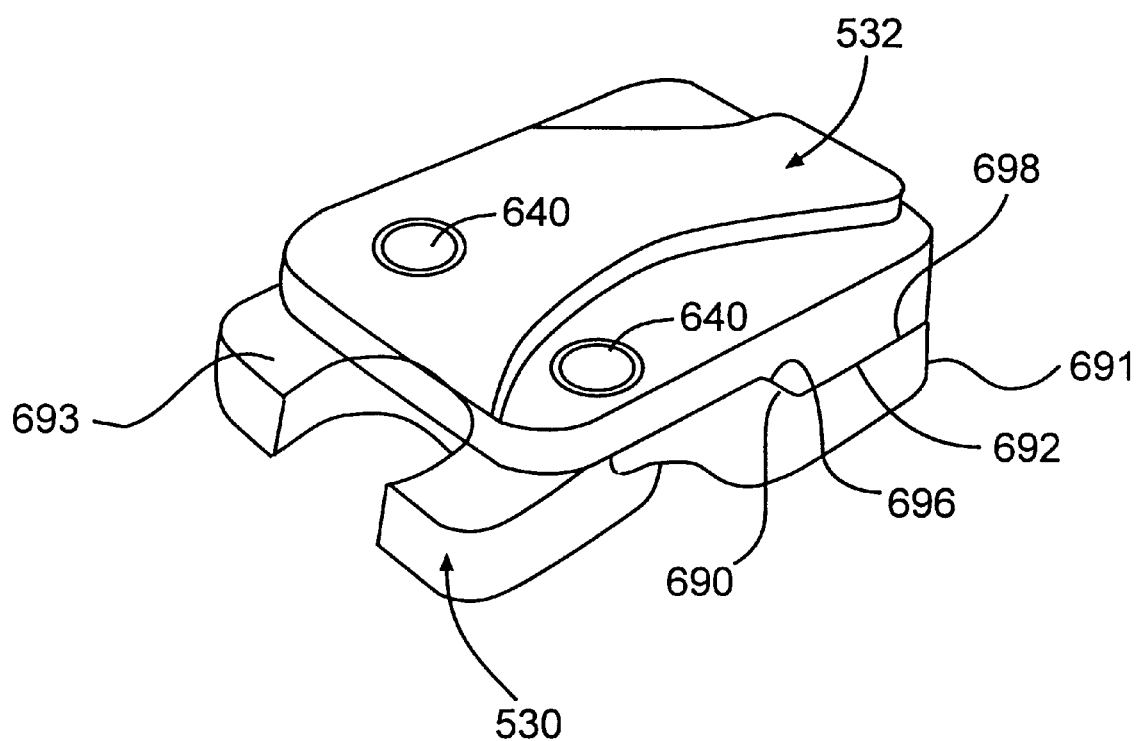
FIG. 27 is a perspective view illustrating a compact arrangement of the two-piece base of the portable basketball system shown in FIG. 25.

FIGS. 25–27 show yet another embodiment of the invention having a front mounted pole, secondary ballast fillable tank 632 and primary ballast fillable tank 630. In this embodiment, the two-piece ballast fillable base is defined by an assembled position (FIG. 25) and a compact shipping/storage position (FIG. 27). In the expanded position, openings 640 in second ballast fillable tank 632 are alignable with openings 642 in primary ballast fillable tank 630 to receive bolts 260 therethrough as illustrated in FIG. 26. The bottom of secondary ballast fillable tank 30 has surfaces 694, 698 and shoulder 696 therebetween and the top and rear end of primary ballast fillable tank 630 has cooperating shoulders 690 and 691 and top surface 692. In the expanded position (FIG. 25), bottom surface 698 contacts the supporting surface (e.g. the ground) and shoulder 696 and surface 694 contact shoulder 691 and top surface 692, respectively such that secondary ballast fillable tank 632 extends past the rear end of tank 632. When in a compact position as shown in FIG. 27, bottom surface 698 contacts top surface 692; shoulder 696 contacts shoulder 690; and bottom surface 694 contacts top surface 693. Strut 624 is formed such that openings 266 therein are alignable with openings 640 and 642. Accordingly, strut 624, primary ballast fillable tank 630 and secondary ballast fillable tank 632 are capable of being secured together.

Figure 28:
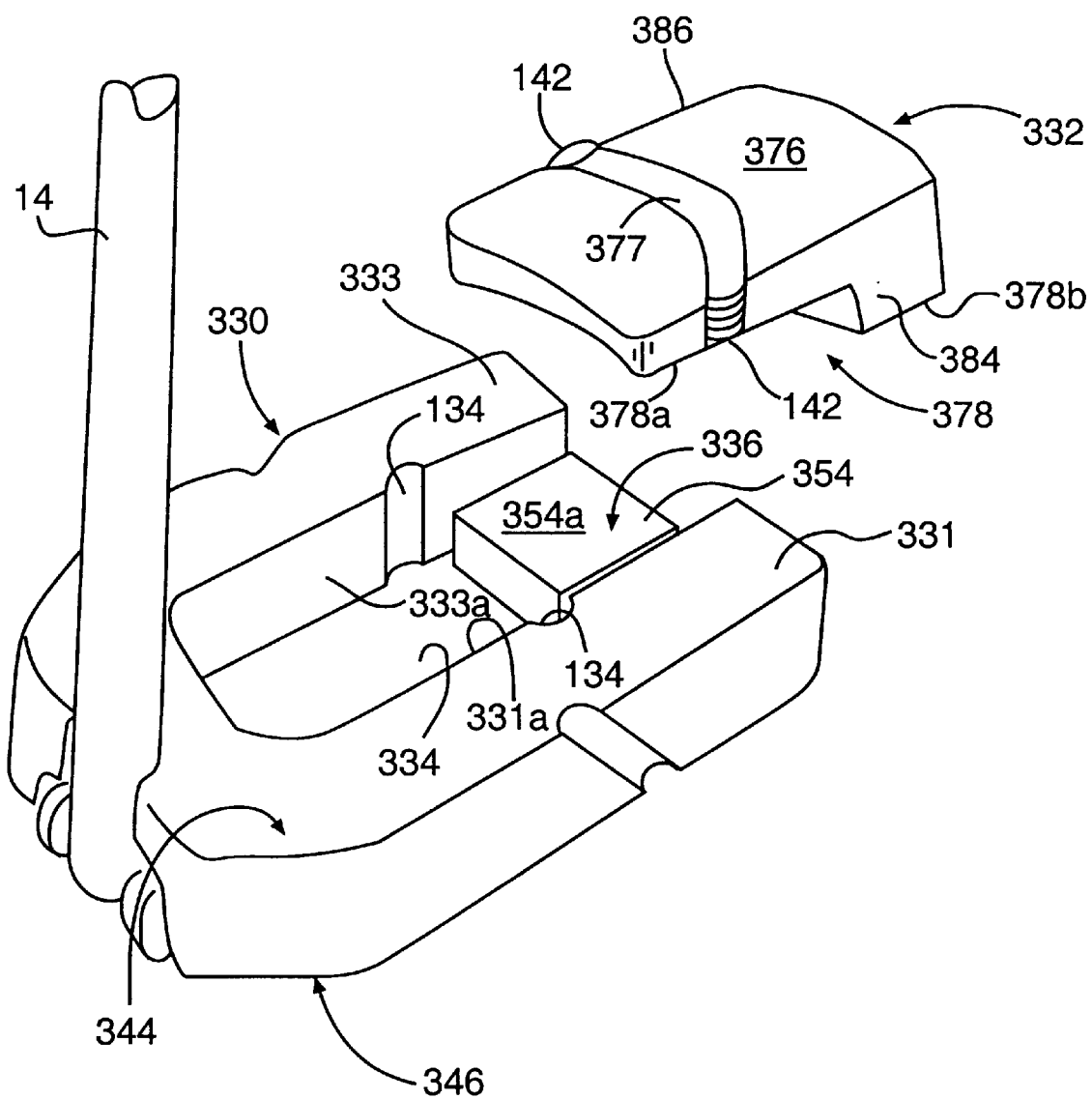
FIG. 28 is an exploded, perspective view of a ballast fillable base for a portable basketball system in accordance with another embodiment of the invention in which the pole is mounted at the front of the two-piece ballast fillable base.

FIG. 28 shows another front-mounted pole embodiment of the invention where the two-piece ballast fillable base is defined by primary ballast fillable tank 320 including raised sections 331 and 333 extending the entire length of primary ballast fillable tank 330. Opening 334 is bounded laterally by sidewalls 331*a* and 333*a* each including a groove 134 extending from top 344 to bottom 346 of primary ballast fillable tank 330. Indentation 336 extends rearwardly from opening 334 to the rear end of tank 320 and is defined by land 354 having top surface 354*a*, and the portions of sidewalls 331*a*, 333*a* disposed above surface 354*a*. Secondary ballast fillable tank 332 includes protuberances 142 extending outwardly from sides 384 and 386 and extending along sides 384, 386 of secondary ballast fillable tank 332 from top 376 to portion 378*a* of bottom 378. A recess 377 is formed in top 376. In particular, protuberances 142 are slidable into recesses 134 such that bottom 378*a* contacts top surface 354*a* of land 354. Protuberances 142 are engaged with recesses 134 to connect primary and secondary ballast fillable tank 330 and 332 together and prevent lateral shifting movement of secondary ballast fillable tank 332 in the expanded position. Similar to the other embodiments described above, secondary tank 332 may be received within opening 334 to define a compact configuration of the base.

Figure 29:
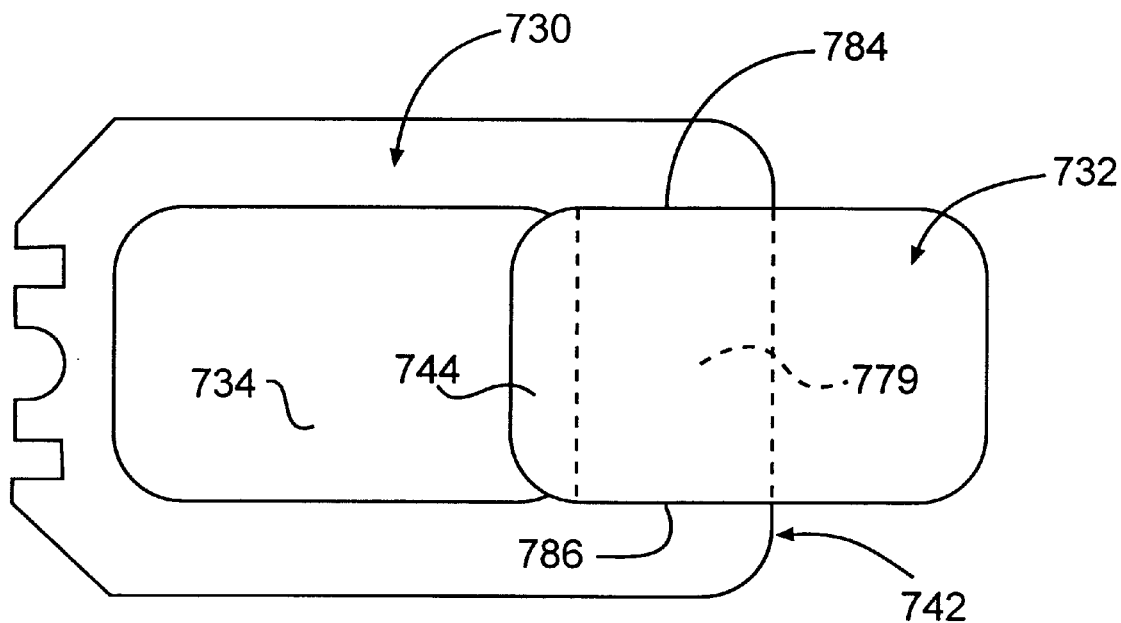
FIG. 29 is a top view of a ballast fillable base of a portable basketball system in an expanded position in accordance with a further embodiment of the invention.
Figure 30:
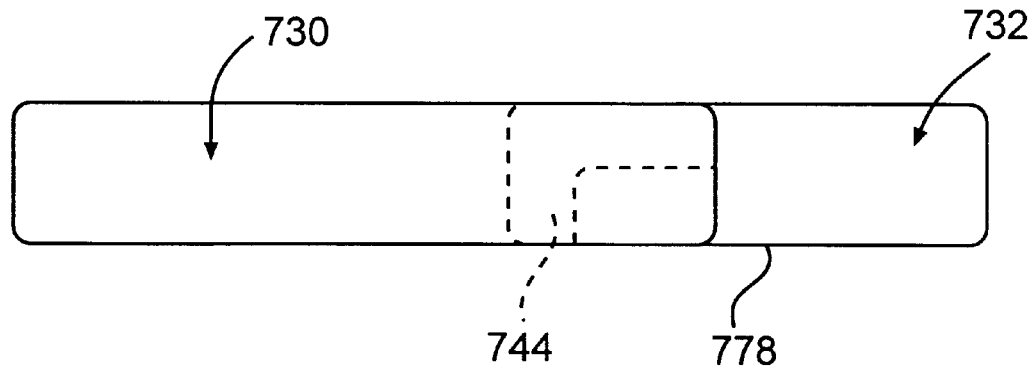
FIG. 30 is a side view of the portable basketball system shown in FIG. 29.
Figure 31:
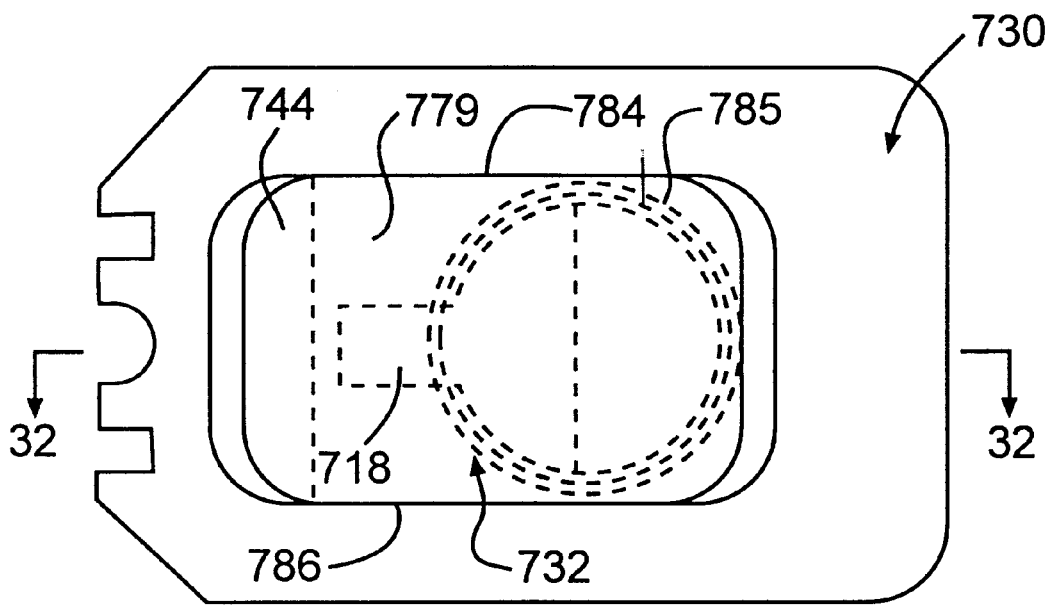
FIG. 31 is a top view of a compact position of the ballast fillable base in accordance with the further embodiment of the invention shown in FIG. 29.
Figure 32:
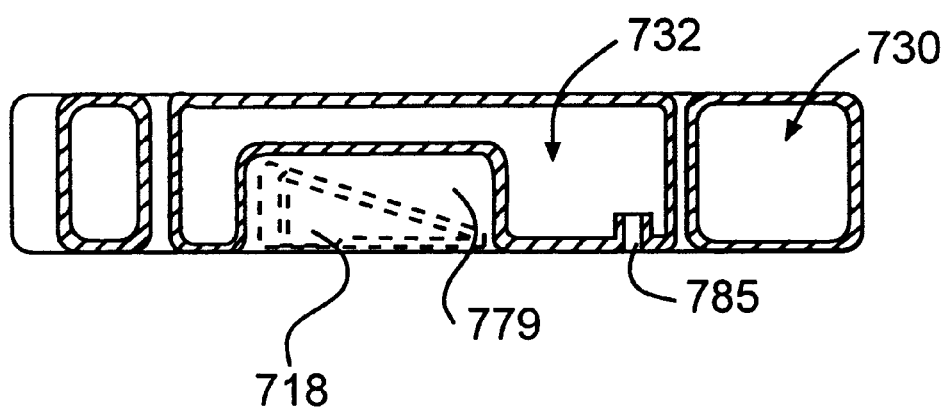
FIG. 32 is a cross-sectional view taken along line 32—32 of FIG. 31.

FIGS. 29 and 30 illustrate schematically yet another embodiment of the invention where secondary ballast fillable tank 732 includes a lip 744 shown in phantom for interlocking secondary ballast fillable tank 632 with primary ballast fillable tank 630 in an expanded position (FIG. 29) such that secondary ballast fillable tank 372 is rearwardly disposed beyond rear end 742 of primary ballast fillable tank 730. As shown in FIGS. 31 and 32, secondary ballast fillable tank 732 has a bottom 778 including a recess 779 extending from side 784 to side 786 and an arcuate recess 785, which may be formed in secondary ballast fillable tank 732 alone (as shown) or in combination with primary ballast fillable tank 730 (not shown). In the expanded position (FIG. 29), recess 779 receives land 754 on rear end 742 of primary ballast fillable tank 730 such that lip 744 is disposed in opening 734 adjacent the rear boundary of the opening. In the compact position shown in FIG. 31, secondary ballast fillable tank 732 is disposed substantially entirely in opening 734. Accordingly, recess 779 and arcuate recess 785 may receive a goal 718 or other components or hardware in the compact position for purposes of compact shipping and storage.

What is claimed is:

1. A method of packaging a base of a portable basketball system having first and second ballast tanks, said method comprising the steps of:

nesting the first ballast tank in the second ballast tank without substantially increasing the cubic dimension of the second ballast tank to produce a base having a reduced configuration for shipping; and providing a shipping container.

2. A method of packaging according to claim 1, wherein the nesting step comprises nesting the first ballast tank in an exterior contour of the second ballast tank.

3. A method of packaging according to claim 1 wherein the first ballast tank is engageable with the second ballast tank in a first configuration to support a basketball goal support pole, said method further comprising the step of disengaging the first ballast tank from the first configuration before performing said step of nesting the first ballast tank in the second ballast tank in a second configuration that is more compact than the first configuration.

4. A method of packaging according to claim 1 wherein a basketball goal support pole is supported by inserting one end of the support pole in an opening in the base, said method further comprising the step of removing the basketball goal support pole from an opening in the first ballast tank.

5. A method of packaging according to claim 4 wherein the basketball goal support pole is buttressed by at least one reinforcing pole attached to the base, said method further comprising the step of detaching the reinforcing pole from at least one of the base and the basketball goal support pole.

6. A method of packaging according to claim 1 wherein a basketball goal support pole is supported by inserting one end of the support pole in an opening in the base, said method further comprising the step of removing the basketball goal support pole from an opening in the second ballast tank.

7. A method of packaging according to claim 6 wherein the basketball goal support pole is buttressed by at least one reinforcing pole attached to the base, said method further comprising the step of detaching the reinforcing pole from at least one of the base and the basketball goal support pole.

* * * * *